United States Patent
Sather et al.

(10) Patent No.: US 11,604,973 B1
(45) Date of Patent: Mar. 14, 2023

(54) REPLICATION OF NEURAL NETWORK LAYERS

(71) Applicant: Perceive Corporation, San Jose, CA (US)

(72) Inventors: Eric A. Sather, Palo Alto, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 553 days.

(21) Appl. No.: 16/698,942

(22) Filed: Nov. 27, 2019

Related U.S. Application Data

(63) Continuation of application No. 16/684,128, filed on Nov. 14, 2019.

(60) Provisional application No. 62/926,382, filed on Oct. 25, 2019, provisional application No. 62/926,382, (Continued)

(51) Int. Cl.
| | |
|---|---|
| *G06F 17/10* | (2006.01) |
| *G06N 3/063* | (2023.01) |
| *G06F 17/16* | (2006.01) |
| *G06N 3/084* | (2023.01) |

(52) U.S. Cl.
CPC .............. *G06N 3/063* (2013.01); *G06F 17/16* (2013.01); *G06N 3/084* (2013.01)

(58) Field of Classification Search
CPC ......... G06N 3/063; G06N 3/084; G06F 17/16
See application file for complete search history.

(56) References Cited

U.S. PATENT DOCUMENTS

| | | | | |
|---|---|---|---|---|
| 5,461,698 | A | * 10/1995 | Schwanke | ............ G06K 9/6253 706/31 |
| 5,621,863 | A | 4/1997 | Boulet et al. | |
| 5,717,832 | A | 2/1998 | Steimle et al. | |

(Continued)

FOREIGN PATENT DOCUMENTS

| | | | |
|---|---|---|---|
| CN | 108876698 A | 11/2018 | |
| CN | 108280514 B | * 10/2020 | ............. G06N 3/063 |

(Continued)

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

(Continued)

*Primary Examiner* — Cheng Yuan Tseng
(74) *Attorney, Agent, or Firm* — Adeli LLP

(57) ABSTRACT

Some embodiments provide a method for training parameters of a machine-trained (MT) network. The method receives an MT network with multiple layers of nodes, each of which computes an output value based on a set of input values and a set of trained weight values. Each layer has a set of allowed weight values. For a first layer with a first set of allowed weight values, the method defines a second layer with nodes corresponding to each of the nodes of the first layer, each second-layer node receiving the same input values as the corresponding first-layer node. The second layer has a second, different set of allowed weight values, with the output values of the nodes of the first layer added with the output values of the corresponding nodes of the second layer to compute output values that are passed to a subsequent layer. The method trains the weight values.

20 Claims, 24 Drawing Sheets

Related U.S. Application Data filed on Oct. 25, 2019, provisional application No. 62/775,886, filed on Dec. 5, 2018.

(56) References Cited

U.S. PATENT DOCUMENTS

| | | | |
|---|---|---|---|
| 5,740,326 | A | 4/1998 | Boulet et al. |
| 5,956,703 | A | 9/1999 | Turner et al. |
| 9,858,636 | B1 | 1/2018 | Lim et al. |
| 10,217,346 | B1* | 2/2019 | Zhang ................ G06N 3/084 |
| 10,445,638 | B1 | 10/2019 | Amirineni et al. |
| 10,489,478 | B2 | 11/2019 | Lim et al. |
| 10,515,303 | B2* | 12/2019 | Lie .................... G06N 3/063 |
| 10,657,438 | B2* | 5/2020 | Lie ................. G06F 9/30014 |
| 10,685,285 | B2* | 6/2020 | Simard ............. G06N 3/0454 |
| 10,768,856 | B1 | 9/2020 | Diamant et al. |
| 10,796,198 | B2 | 10/2020 | Franca-Neto |
| 10,949,736 | B2* | 3/2021 | Deisher ............ G06N 3/0454 |
| 11,138,292 | B1 | 10/2021 | Nair et al. |
| 11,210,589 | B2* | 12/2021 | Baker ............... G06K 9/6227 |
| 11,423,289 | B2 | 8/2022 | Judd et al. |
| 2004/0078403 | A1 | 4/2004 | Scheuermann et al. |
| 2016/0342893 | A1 | 11/2016 | Ross et al. |
| 2017/0011006 | A1 | 1/2017 | Saber et al. |
| 2017/0161640 | A1 | 6/2017 | Shamir |
| 2017/0323196 | A1 | 11/2017 | Gibson et al. |
| 2018/0018559 | A1 | 1/2018 | Yakopcic et al. |
| 2018/0101763 | A1 | 4/2018 | Barnard et al. |
| 2018/0114569 | A1 | 4/2018 | Strachan et al. |
| 2018/0121796 | A1 | 5/2018 | Deisher et al. |
| 2018/0189229 | A1 | 7/2018 | Desoli et al. |
| 2018/0197068 | A1 | 7/2018 | Narayanaswami et al. |
| 2018/0246855 | A1 | 8/2018 | Redfern et al. |
| 2018/0285727 | A1 | 10/2018 | Baum et al. |
| 2018/0293490 | A1 | 10/2018 | Ma et al. |
| 2018/0293493 | A1 | 10/2018 | Kalamkar et al. |
| 2018/0293691 | A1 | 10/2018 | Nurvitadhi et al. |
| 2018/0300600 | A1 | 10/2018 | Ma et al. |
| 2018/0307494 | A1 | 10/2018 | Ould-Ahmed-Vall et al. |
| 2018/0307950 | A1 | 10/2018 | Nealis et al. |
| 2018/0307980 | A1 | 10/2018 | Barik et al. |
| 2018/0307985 | A1 | 10/2018 | Appu et al. |
| 2018/0308202 | A1 | 10/2018 | Appu et al. |
| 2018/0322386 | A1 | 11/2018 | Sridharan et al. |
| 2018/0373975 | A1 | 12/2018 | Yu et al. |
| 2019/0026078 | A1 | 1/2019 | Bannon et al. |
| 2019/0026237 | A1 | 1/2019 | Talpes et al. |
| 2019/0026249 | A1 | 1/2019 | Talpes et al. |
| 2019/0095776 | A1 | 3/2019 | Kfir et al. |
| 2019/0114499 | A1 | 4/2019 | Delaye et al. |
| 2019/0138891 | A1 | 5/2019 | Kim et al. |
| 2019/0147338 | A1* | 5/2019 | Pau .................... G06N 5/003 706/20 |
| 2019/0156205 | A1* | 5/2019 | Gebre ............... G06N 3/0481 |
| 2019/0171927 | A1 | 6/2019 | Diril et al. |
| 2019/0180176 | A1 | 6/2019 | Yudanov et al. |
| 2019/0188557 | A1 | 6/2019 | Lowell et al. |
| 2019/0196970 | A1 | 6/2019 | Han et al. |
| 2019/0205736 | A1 | 7/2019 | Bleiweiss et al. |
| 2019/0205739 | A1 | 7/2019 | Liu et al. |
| 2019/0205740 | A1 | 7/2019 | Judd et al. |
| 2019/0205780 | A1 | 7/2019 | Sakaguchi |
| 2019/0244082 | A1* | 8/2019 | Franca-Neto ....... G06N 3/0454 |
| 2019/0294413 | A1 | 9/2019 | Vantrease et al. |
| 2019/0294968 | A1 | 9/2019 | Vantrease et al. |
| 2019/0303749 | A1 | 10/2019 | Appuswamy et al. |
| 2019/0325296 | A1 | 10/2019 | Fowers et al. |
| 2019/0332925 | A1 | 10/2019 | Modha |
| 2019/0347559 | A1 | 11/2019 | Kang et al. |
| 2019/0385046 | A1 | 12/2019 | Cassidy et al. |
| 2020/0042856 | A1 | 2/2020 | Datta et al. |
| 2020/0042859 | A1 | 2/2020 | Mappouras et al. |
| 2020/0089506 | A1 | 3/2020 | Power et al. |
| 2020/0134461 | A1 | 4/2020 | Chai et al. |
| 2020/0302269 | A1 | 9/2020 | Ovtcharov et al. |
| 2020/0311572 | A1* | 10/2020 | Baker ................. G06N 20/20 |
| 2020/0380344 | A1* | 12/2020 | Lie ..................... G06N 7/005 |
| 2021/0110236 | A1* | 4/2021 | Shibata .............. G06N 3/0454 |
| 2021/0173787 | A1 | 6/2021 | Nagy et al. |
| 2021/0241082 | A1 | 8/2021 | Nagy et al. |

FOREIGN PATENT DOCUMENTS

| | | | | |
|---|---|---|---|---|
| CN | 113255885 | A * | 8/2021 | .......... G06K 9/4628 |
| RU | 2406105 | C2 * | 12/2010 | |
| WO | WO-2020000689 | A1 * | 1/2020 | ............ G06Q 40/06 |
| WO | WO-2020044527 | A1 * | 3/2020 | |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 EEE Conference on Computer Vision and Pattern Recognition (CVPR 2017), Jul. 21-26, 2017, 10 pages, IEEE, Honolulu, HI, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Cho, Minsik, et al., "MEC: Memory-Efficient Convolution for Deep Neural Network," Jun. 21, 2017, 10 pages, arXiv:1706.06873v1, Computer Research Repository (CoRR)—Cornell University, Ithaca, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc, San Jose, CA, USA.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Temarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the

(56) References Cited

OTHER PUBLICATIONS

45th Annual International Symposium on Computer Architecture (ISCA '18), Jun. 2-6, 2018, 14 pages, IEEE Press, Los Angeles, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.
Huang, Gao, et al.,"Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.
Jain, Anil K., et al., "Artificial Neural Networks: A Tutorial," Computer, Mar. 1996, 14 pages, vol. 29, Issue 3, IEEE.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Molchanov, Dmitry, et al., "Variational Dropout Sparsities Deep Neural Networks," Feb. 27, 2017, 10 pages, arXiv:1701 05369v2, Computing Research Repository (CoRR)—Cornell University, Ithaca, NY, USA.
Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51—Issue 5, IEEE Computer Society, Washington, D.C.
Non-Published Commonly Owned U.S. Appl. No. 16/684,128, filed Nov. 14, 2019, 100 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.
Sen, Sanchari, et al., "SPARCE: Sparsity aware General Purpose Core Extensions to Accelerate Deep Neural Networks," Nov. 29, 2017, 13 pages, arXiv:1711,06315v2, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.
Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.
Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.
Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
Ardakani, Arash, et al., "An Architecture to Accelerate Convolution in Deep Neural Networks," IEEE Transactions on Circuits and Systems I: Regular Papers, Oct. 17, 2017, 14 pages, vol. 65, No. 4, IEEE.

\* cited by examiner

*Figure 18*

| PPU | alu_a | alu_b | alu_c | alu_d |
|---|---|---|---|---|
| 0 | alu0[0] | alu2[0] | alu0[0] | alu0[1:0] |
| 1 | alu0[1] | alu2[1] | alu0[1] | alu0[3:2] |
| 2 | alu0[2] | alu2[2] | alu0[2] | alu0[5:4] |
| 3 | alu0[3] | alu2[3] | alu0[3] | alu0[7:6] |
| 4 | alu0[4] | alu2[4] | alu0[4] | alu0[9:8] |
| 5 | alu0[5] | alu2[5] | alu0[5] | alu0[11:10] |
| 6 | alu0[6] | alu2[6] | alu0[6] | alu0[13:12] |
| 7 | alu0[7] | alu2[7] | alu0[7] | alu0[15:14] |
| 8 | alu0[8] | alu2[8] | alu0[8] | alu0[17:16] |
| 9 | alu0[9] | alu2[9] | alu0[9] | alu0[19:18] |
| 10 | alu0[10] | alu2[10] | alu0[10] | alu0[21:20] |
| 11 | alu0[11] | alu2[11] | alu0[11] | alu0[23:22] |
| 12 | alu0[12] | alu2[12] | alu0[12] | alu0[25:24] |
| 13 | alu0[13] | alu2[13] | alu0[13] | alu0[27:26] |
| 14 | alu0[14] | alu2[14] | alu0[14] | alu0[29:28] |
| 15 | alu0[15] | alu2[15] | alu0[15] | alu0[31:30] |

| PPU | alu_a | alu_b | alu_c | alu_d |
|---|---|---|---|---|
| 16 | alu0[16] | alu2[16] | alu1[0] | alu1[1:0] |
| 17 | alu0[17] | alu2[17] | alu1[1] | alu1[3:2] |
| 18 | alu0[18] | alu2[18] | alu1[2] | alu1[5:4] |
| 19 | alu0[19] | alu2[19] | alu1[3] | alu1[7:6] |
| 20 | alu0[20] | alu2[20] | alu1[4] | alu1[9:8] |
| 21 | alu0[21] | alu2[21] | alu1[5] | alu1[11:10] |
| 22 | alu0[22] | alu2[22] | alu1[6] | alu1[13:12] |
| 23 | alu0[23] | alu2[23] | alu1[7] | alu1[15:14] |
| 24 | alu0[24] | alu2[24] | alu1[8] | alu1[17:16] |
| 25 | alu0[25] | alu2[25] | alu1[9] | alu1[19:18] |
| 26 | alu0[26] | alu2[26] | alu1[10] | alu1[21:20] |
| 27 | alu0[27] | alu2[27] | alu1[11] | alu1[23:22] |
| 28 | alu0[28] | alu2[28] | alu1[12] | alu1[25:24] |
| 29 | alu0[29] | alu2[29] | alu1[13] | alu1[27:26] |
| 30 | alu0[30] | alu2[30] | alu1[14] | alu1[29:28] |
| 31 | alu0[31] | alu2[31] | alu1[15] | alu1[31:30] |

*Figure 20A*

| PPU | alu_a | alu_b | alu_c | alu_d |
|---|---|---|---|---|
| 32 | alu1[0] | alu3[0] | alu2[0] | alu2[1:0] |
| 33 | alu1[1] | alu3[1] | alu2[1] | alu2[3:2] |
| 34 | alu1[2] | alu3[2] | alu2[2] | alu2[5:4] |
| 35 | alu1[3] | alu3[3] | alu2[3] | alu2[7:6] |
| 36 | alu1[4] | alu3[4] | alu2[4] | alu2[9:8] |
| 37 | alu1[5] | alu3[5] | alu2[5] | alu2[11:10] |
| 38 | alu1[6] | alu3[6] | alu2[6] | alu2[13:12] |
| 39 | alu1[7] | alu3[7] | alu2[7] | alu2[15:14] |
| 40 | alu1[8] | alu3[8] | alu2[8] | alu2[17:16] |
| 41 | alu1[9] | alu3[9] | alu2[9] | alu2[19:18] |
| 42 | alu1[10] | alu3[10] | alu2[10] | alu2[21:20] |
| 43 | alu1[11] | alu3[11] | alu2[11] | alu2[23:22] |
| 44 | alu1[12] | alu3[12] | alu2[12] | alu2[25:24] |
| 45 | alu1[13] | alu3[13] | alu2[13] | alu2[27:26] |
| 46 | alu1[14] | alu3[14] | alu2[14] | alu2[29:28] |
| 47 | alu1[15] | alu3[15] | alu2[15] | alu2[31:30] |
| 48 | alu1[16] | alu3[16] | alu3[0] | alu3[1:0] |
| 49 | alu1[17] | alu3[17] | alu3[1] | alu3[3:2] |
| 50 | alu1[18] | alu3[18] | alu3[2] | alu3[5:4] |
| 51 | alu1[19] | alu3[19] | alu3[3] | alu3[7:6] |
| 52 | alu1[20] | alu3[20] | alu3[4] | alu3[9:8] |
| 53 | alu1[21] | alu3[21] | alu3[5] | alu3[11:10] |
| 54 | alu1[22] | alu3[22] | alu3[6] | alu3[13:12] |
| 55 | alu1[23] | alu3[23] | alu3[7] | alu3[15:14] |
| 56 | alu1[24] | alu3[24] | alu3[8] | alu3[17:16] |
| 57 | alu1[25] | alu3[25] | alu3[9] | alu3[19:18] |
| 58 | alu1[26] | alu3[26] | alu3[10] | alu3[21:20] |
| 59 | alu1[27] | alu3[27] | alu3[11] | alu3[23:22] |
| 60 | alu1[28] | alu3[28] | alu3[12] | alu3[25:24] |
| 61 | alu1[29] | alu3[29] | alu3[13] | alu3[27:26] |
| 62 | alu1[30] | alu3[30] | alu3[14] | alu3[29:28] |
| 63 | alu1[31] | alu3[31] | alu3[15] | alu3[31:30] |

*Figure 20B*

REPLICATION OF NEURAL NETWORK LAYERS

CLAIM OF BENEFIT TO PRIOR APPLICATIONS

This application claims the benefit of U.S. Provisional Patent Application 62/926,382, filed Oct. 25, 2019, and U.S. Provisional Patent Application 62/775,886, filed Dec. 5, 2018. This application is also a continuation application of U.S. patent application Ser. No. 16/684,128, filed Nov. 14, 2019. U.S. patent application Ser. No. 16/684,128 claims the benefit of U.S. Provisional Patent Application 62/926,382, filed Oct. 25, 2019, and U.S. Provisional Patent Application 62/775,886, filed Dec. 5, 2018. U.S. patent application Ser. No. 16/684,128 and U.S. Provisional Patent Applications 62/775,886 and 62/926,382, are incorporated herein by reference.

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. Recently, techniques have been introduced to solve this issue in part by creating very sparse networks (i.e., with most weight values set to zero). However, in some cases this can reduce complexity of the network too far.

BRIEF SUMMARY

Some embodiments of the invention train the parameters of a machine-trained (MT) network by using multiple copies of certain layers of the network in order to increase a number of possible values for parameters of the layer. In some embodiments, each parameter of a set of the parameters has a discrete set of associated possible values, and using multiple copies of a network layer increases this set of associated possible values for the parameters of a layer. In some embodiments, the MT network is a multi-layer network, with each layer including one or more computation nodes. Each node generates an output value based on one or more input values (which in many cases are output values of some or all of the nodes of a previous layer) and one or more parameters. Specifically, for many of the layers in some embodiments, each node linearly combines its input values according to a set of parameters (referred to as weight values), then applies a non-linear function to the result of this linear combination.

In some embodiments, each layer of nodes is assigned a discrete set of possible weight values during training. That is, after training, each weight value for each node in the layer will have an assigned weight value that is one of the possible weight values for the layer. In some such embodiments, the discrete set has two possible values of {0, positive value} or three possible values of {0, positive value, negation of positive value}. The positive value, often referred to as the $\alpha_k$ for the layer, can vary between layers. During training, various techniques are used (e.g., as factors in a loss function that measures network output accuracy and is used to adjust the weight values and other parameters) to bias/constrain the parameters towards these two or three values and, in some embodiments, to ensure that at least a threshold percentage of the values are set to 0.

These techniques of (i) using at most three weight values per layer that can be represented as {0, 1, −1} and (ii) ensuring that at least a threshold percentage of the weight values are 0 enables the design of MT networks that can be loaded onto and executed by specialized network inference circuits that use the network to process input data (e.g., images, sound clips, etc.) for which the network is trained. Specifically, certain neural network computation chips are designed for networks that meet these constraints.

However, in some cases, a network will have some layers with a lower number of weight values than is typical for the rest of the network, and using these techniques can result in a loss of accuracy at these layers (e.g., the initial layer of a network, 1×1 convolution layers). To ensure that these layers do not result in such a loss of accuracy, some embodiments duplicate (or triplicate, etc.) the layer but use a different (though related) set of possible weight values than the original version of the layer, then add together the outputs of the original and duplicate (and triplicate, etc.) layers. This effectively increases the number of possible weight values for the layer, while still (i) ensuring that the requisite percentage of 0 values is reached and (ii) enabling the network to be executed by a chip designed for only two or three possible input values per layer.

Specifically, if the original layer has a set of associated possible weight values {0, $\alpha_k$, −$\alpha_k$}, then the second copy of the layer is assigned possible weight values of {0, 3$\alpha_k$, −3$\alpha_k$} or {0, $\alpha_k/3$, −$\alpha_k/3$ }. If a third copy of the layer is used, then this third copy is assigned possible weight values of {0, $\alpha_k$, −9$\alpha_k$} or {0, $\alpha_k/9$, −$\alpha_k/9$}. Subsequent replica layers allow for additional precision. Each node in each replica layer receives the same input as its corresponding node in the original layer, and each copy of the nodes generates its output separately. Before providing the outputs to the next layer of the network, the output of each original layer node is added together with the outputs of its corresponding nodes in the replica layers. The effective result is that each node has an effective set of 9 possible weight values if the layer is duplicated, 27 possible weight values if the layer is triplicated, etc.

Similarly, if the original layer has two possible associated weight values of {0, $\alpha_k$}, then the possible weight values for the duplicate layer are {0, 2$\alpha_k$} or {0, $\alpha_k/2$}, the possible weight values for the triplicate layer are {0, 4$\alpha_k$} or {0, $\alpha_k/4$}, etc. In this case, each node effectively has 4 possible weight values if the layer is duplicated and 8 possible weight values if the layer is triplicated.

When training the network with these replica layers, different embodiments use different approaches to training the weight values. To ensure that the weight values end up as members of their associated discrete set of possible values, some embodiments allow the weight values to be modified on a spectrum (i.e., using a floating point value) rather than a discrete set of possible values during the course of training, but use loss function terms that force the weight values towards these discrete values over time. Other embodiments use the alternating direction method of multipliers (ADMM) technique to constrain the weight values for each replica layer to their respective discrete sets of allowed values.

Some embodiments train each set of corresponding weight values (i.e., a particular weight value for the original layer as well as its corresponding weight value in the replica layers) as a single value, adding them together and forcing the trained value towards one of 9 (or 27, etc.) possible values. Other embodiments train each corresponding weight value within such a set independently, forcing each separate weight value towards one of its 3 possible values.

In addition to enabling certain layers (e.g., layers with a lower number of weight values) to include more complexity and therefore avoid losing network accuracy), the use of replica layers also allows for an increase in the percentage of weight values set to 0. Because the non-zero weight values can provide more fine-grained analysis, more of the weight values can equal 0 in some embodiments. In addition, at a conceptual level, by replicating these layers, the data flow through the network becomes more laminar, rather than having the data compress down and expand.

When implemented on a neural network inference circuit such as that described above (i.e., designed for ternary weight values), the replica layers are all treated as separate layers, though the same set of input values are stored for use in each of the multiple copies of the layer. Each of the individual copies of the layer are computed separately, and then the chip combines the outputs of the corresponding sets of nodes using an element-wise operation to compute the output values that are stored as inputs for the next layer. In some embodiments, each replica layer is a convolutional layer, and the chip stores the corresponding outputs of each replica layer in a similar pattern across its memories. This pattern allows for the corresponding outputs to be easily read from the memories for the subsequent element-wise addition operation. Different embodiments may execute the combination of the replica layers as a single element-wise addition operation irrespective of the number of replica layers, or as a series of element-wise additions adding two sets of outputs at a time, depending on the constraints of the chip.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 18 conceptually illustrates a layer of activation values.

FIGS. 20A-B illustrate a table showing the mapping of ALU outputs to the different post-processing units for a neural network computation circuit of some embodiments.

DETAILED DESCRIPTION

Some embodiments of the invention train the parameters of a machine-trained (MT) network by using multiple copies of certain layers of the network in order to increase a number of possible values for parameters (e.g., weights) of the layer. In some embodiments, each parameter of a set of the parameters has a discrete set of associated possible values, and using multiple copies of a network layer (i.e., replicating the layer) increases this set of associated possible values for the parameters of a layer. In some embodiments, the MT network is a multi-layer network, with each layer including one or more computation nodes. Each node generates an output value based on one or more input values (which in many cases are output values of some or all of the nodes of a previous layer) and one or more parameters. Specifically, for many of the layers in some embodiments, each node linearly combines its input values according to a set of parameters (referred to as weight values), then applies a non-linear function to the result of this linear combination.

Figure 1:
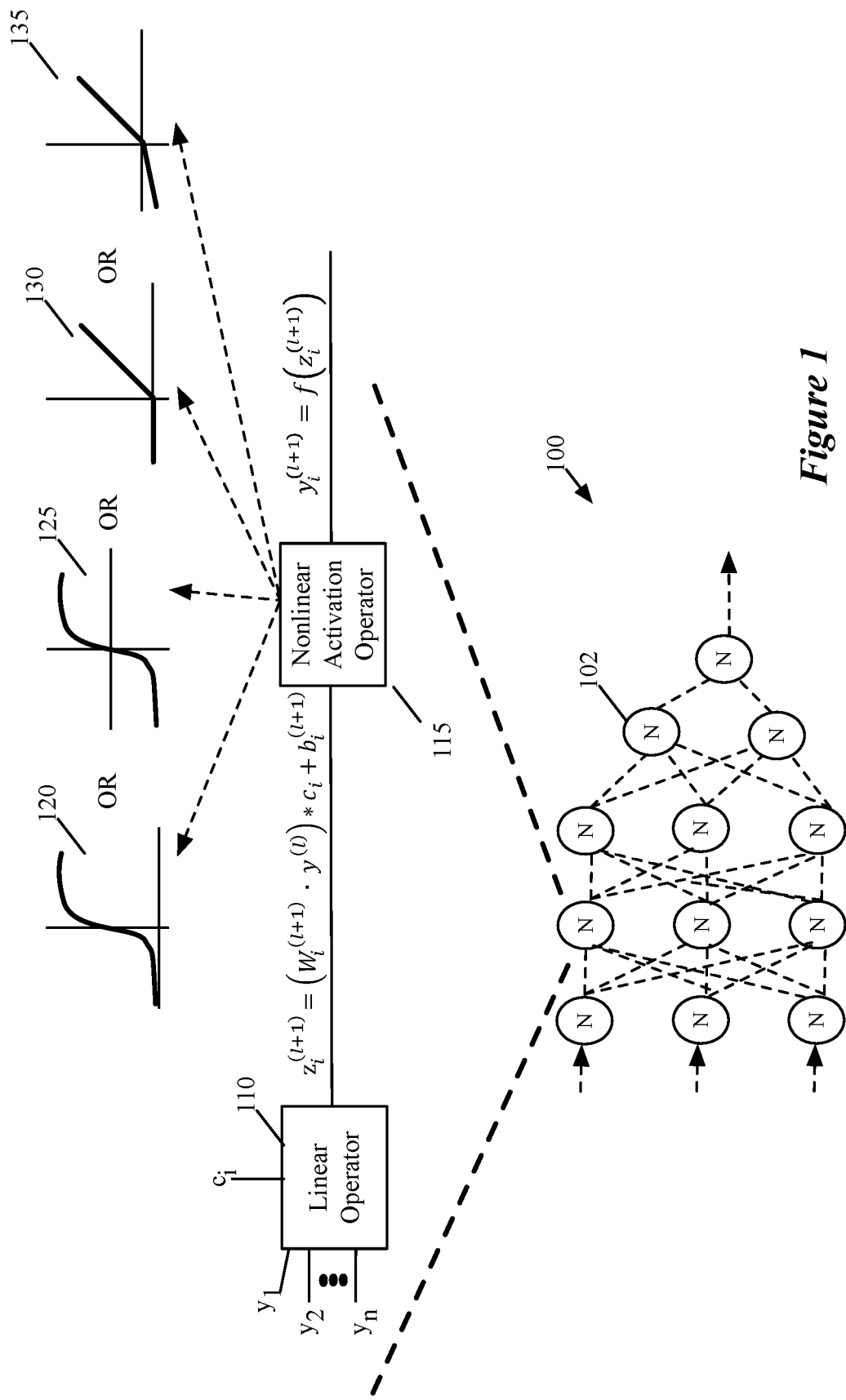
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (1)$$

The constant value $c_i$ is a value to which all the weight values are normalized. In some embodiments, the constant value $c_i$ is 1. The symbol * is an element-wise product, while the symbol □ is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (2) below:

$$y_i^{(l+1)} = f(z_i^{(l+1)}) \quad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (2) can be expressed in the following expanded format of Equation (3):

$$y_i^{(l+1)} = f(z_i^{(l+1)}) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Figure 2:
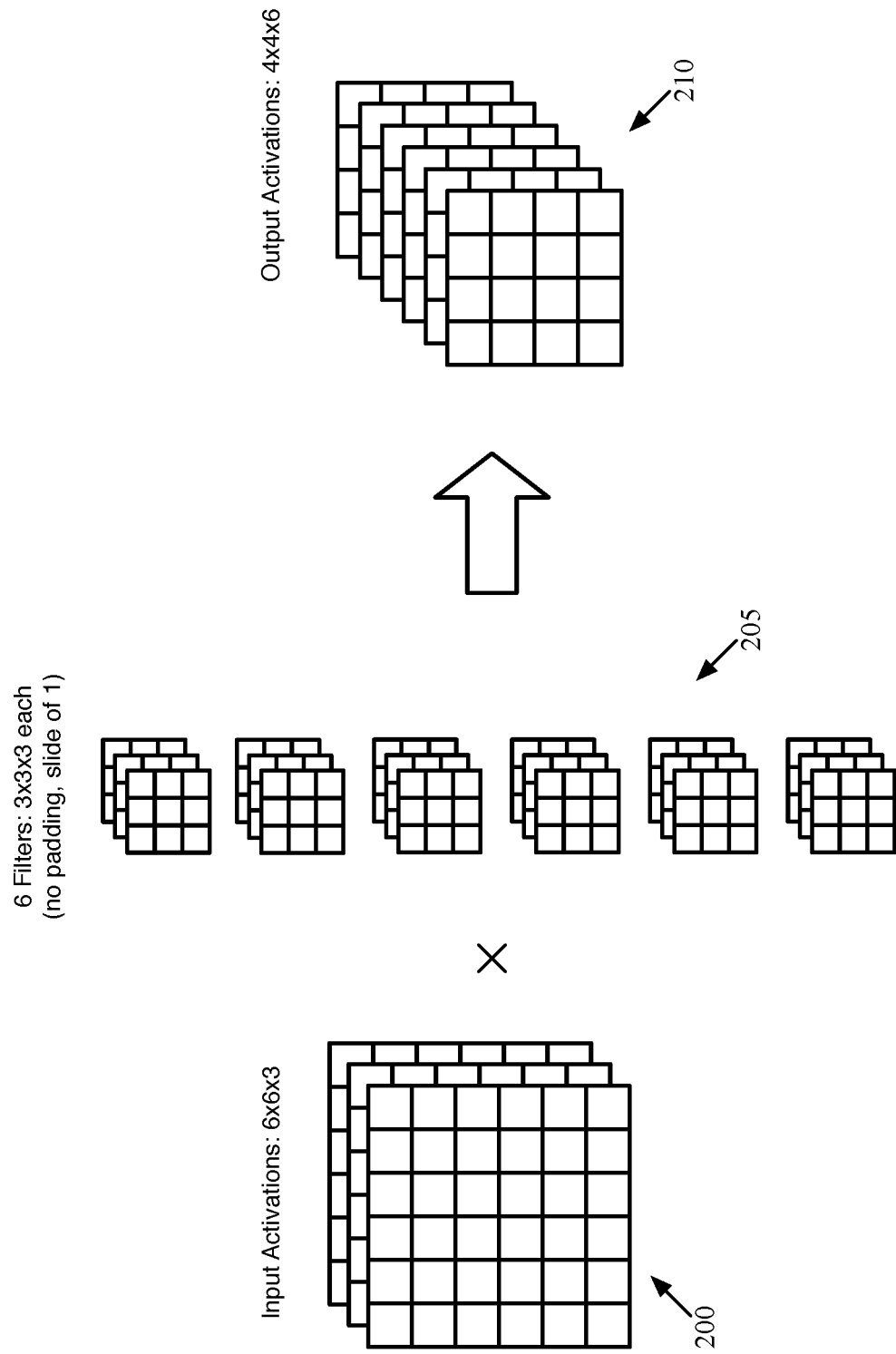
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values is 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, or channels, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filter 205 the output activations have six grids. Using a slide value of 1 with no zero-padding results in a 4×4output grid for each filter. These output activation values 210 are then the input activation values for the next layer of the neural network.

Before a multi-layer network (e.g., a convolutional neural network) can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

Figure 3:
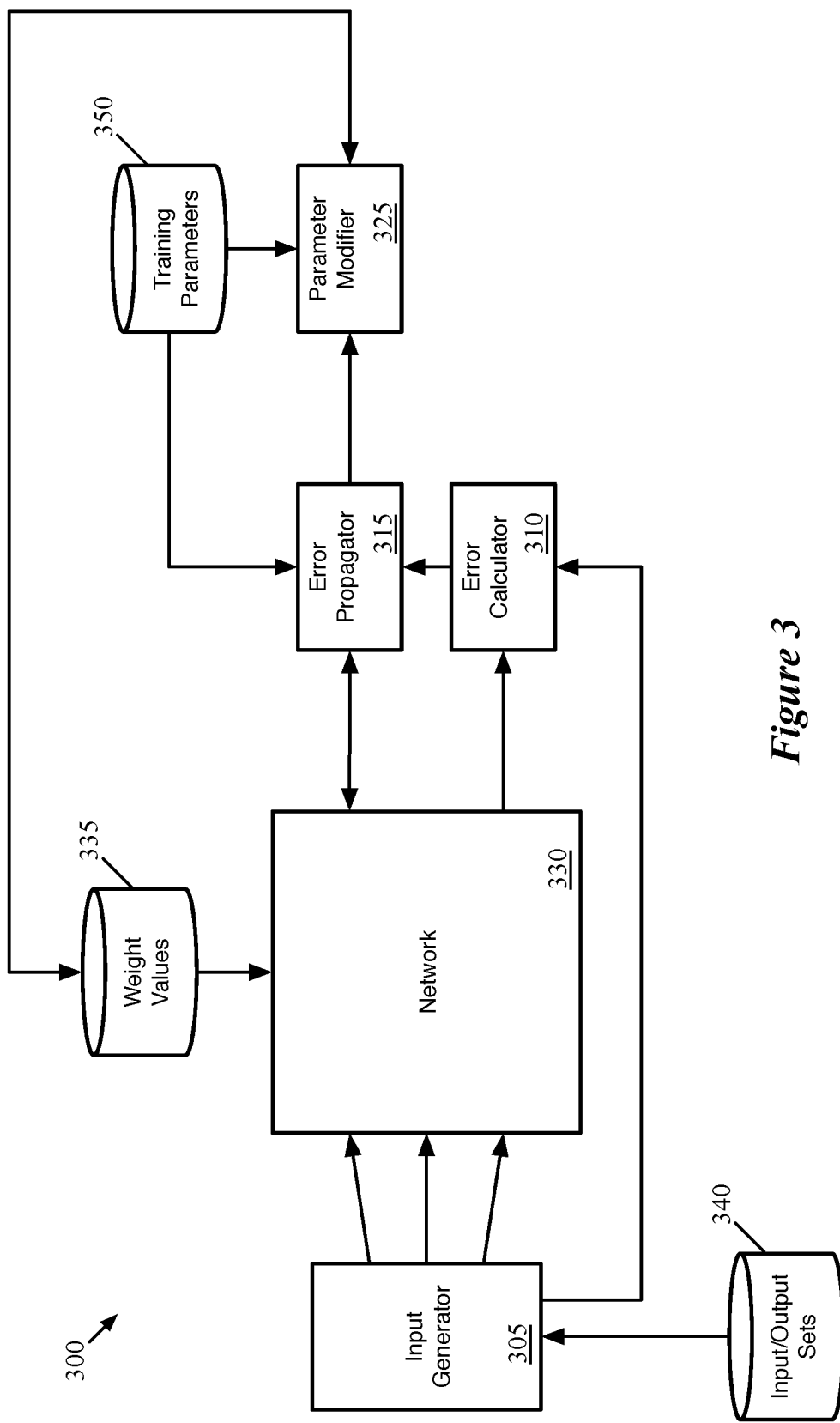
FIG. 3 conceptually illustrates a training system of some embodiments that introduces additional terms to the loss function to (i) push the weight values towards sets of discrete values and (ii) ensure that at least a threshold percentage of the trained weight values are equal to zero.

FIG. 3 conceptually illustrates a training system 300 of some embodiments that trains the weight values (and other parameters) of a network so as to ensure that (i) each weight is assigned a value that belongs to a discrete set of allowed weight values for that weight and (ii) at least a threshold percentage of the trained weight values are equal to zero (which is one of the allowed weight values for each of the weights. In some embodiments, the training system 300 uses the sets of allowed weight values (which may be the same for all nodes in a network being trained, different for each layer of nodes, or different for each node in the network) to generate additional biasing terms for the loss function that are used in the training, in order to push the trained weight values towards those allowed values. The resulting discrete weight values are used for the multi-layer machine-trained network when embedded in a device.

Some embodiments initially train the network with floating point weight values, then use these initially trained weight values to initialize each weight to a quantized value in the set of allowed weight values for that weight. An additional loss function constraint term is introduced that explicitly constrains the weight values to their respective sets of allowed values, and the Alternating Direction Method of Multipliers (ADMM) technique is used for subsequent training of the quantized values while forcing as many of the weight values as possible to zero. The ADMM technique is described in the paper "Extremely Low Bit Neural Network: Squeeze the Last Bit Out with ADMM" by Leng, Cong, et al., $32^{nd}$ AAAI Conference on Artificial Intelligence, pp. 3466-3473 (2018), which is incorporated herein by reference. In some embodiments, the training is iterative, and alternatingly optimizes (i) the portion of the loss function that measures the difference between expected and actual outputs and (ii) the constraint term that forces the weight values to their sets of allowed values.

As shown, the system 300 includes an input generator 305, an error calculator 310, an error propagator 315, a constraint generator 320, and a weight modifier 325. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power).

In some embodiments, the system initially receives a multi-layer network (including initial weight values), inputs for the network, and expected outputs for these inputs. The network 330 of some embodiments is a multi-layer machine-trained network (e.g., a feed-forward neural network), such as that shown in FIG. 1 or a convolutional neural network. It includes multiple layers of nodes, including a layer of input nodes, at least one layer of hidden nodes, and a layer of output nodes. Each hidden node and output node includes a linear component (that uses the weight values 335) and a non-linear activation function. The network 330 receives an input and generates a corresponding output.

The weight values 335 are used to parametrize the network, and are trained by the system 300 for the network to perform a particular task. In some embodiments, these weights are initialized using a probabilistic distribution for each layer. That is, in some embodiments, the weights within each layer are selected randomly from a Gaussian distribution, the width of which may depend on the range of possible discrete values for that layer. In some embodiments, during the initial training (before applying ADMM and quantizing the weights), the weights are represented by floating point values.

In some embodiments, for a simple, non-replicated layer, the possible candidate weight values (i.e., the set of allowed values) for each weight in the network are $-1$, $0$, and $1$. In other embodiments, the candidate values are different for each layer of the network, with the candidate set being $\{0, \alpha_k, -\alpha_k\}$ for each layer k. In this case, however, the weights can be normalized to the scale of $\{0, 1, -1\}$.

During the initial training process of some embodiments, continuous floating point weight values from $-1$ to $1$ are used, with these values treated as a probabilistic combination of the adjacent discrete candidate weights. Thus, in some such embodiments, a negative weight value is a probabilistic combination of $-1$ and $0$, while a positive weight value is a probabilistic combination of $0$ and $1$. In some embodiments, during forward propagation, each weight is randomly rounded to one of its neighboring allowed candidate values, such that the expectation value of the weight is its continuous (floating point) value. For instance, the value 0.3 would be randomly rounded to either 0 or 1, with a 70% chance of being rounded to 0 and a 30% chance of being rounded to 1. In other embodiments, the initial training does not round the weight for forward propagation, but simply uses the weight at its current floating point value for this initial training.

For subsequent training with ADMM, each of the weights is initialized to one of its respective allowed values, and this value is used during forward propagation. During training, the weights may be pushed between the values in their respective sets of allowed values. For a replicated layer that is effectively multiple layers with different (related) sets of allowed weight values, training pushes each weight in each layer to one of its respective values. For such replicated layers, some embodiments perform the initial floating point training as a single layer, then replicate the layer for the subsequent training with ADMM.

The initialization of the weights for ADMM training is now described, in the case of (i) a network trained with floating points weights (prior to replication), (ii) the use of ternary weights for quantization, and (iii) each replica layer having quantized values smaller than the previous layer (i.e., $\alpha_k/3$, $\alpha_k/9$, etc.). In this case, each weight W is defined as:

$$W = W_0 + W_1 + \ldots + W_r, \quad (4)$$

where $W_0$ represents is the portion of the weight value assigned to the initial layer, $W_1$ represents the portion of the weight assigned to the first replica, etc., up to r additional replica layers with progressively smaller weights. That is, $W_0$ expresses $\alpha_k \times \{-1, 0, 1\}$ of the weight, $W_1$ expresses $$\frac{\alpha_k}{3} \times \{-1, 0, 1\},$$

etc. with $W_x$ generically expressing $$\frac{\alpha_k}{3^x} \times \{-1, 0, 1\}.$$

As a simple example, if $W=0.4$ and there is one replica in addition to the first layer, then $W_0=0.3$ and $W_1=0.1$. That is, in some embodiments with one replica, $W_0=3W/4$, while $W_1=W/4$. For two replicas in addition to the first layer, $W_0=9W/13$, $W_1=3W/13$, and $W_2=W/13$.

To introduce quantization, the weights $W_i$ are quantized to values $Q_0, Q_1, \ldots Q_x \ldots \in \{-1, 0, 1\}$, with $W_0$ expressed using $\alpha_k Q_0$, $W_1$ expressed using $$\frac{\alpha_k}{3} Q_0,$$

etc. This gives Q defined as:

$$Q = Q_0 + \frac{Q_1}{3} + \frac{Q_2}{9} + \ldots + \frac{Q_x}{3^x} + \ldots + \frac{Q_r}{3^r}. \quad (5)$$

The goal in assigning the initial quantized weight values Q is to minimize $$\left\| \frac{W}{\alpha} - Q \right\|,$$

which results in the function $$J = \min_{W_0, W_1, \ldots W_r} \left\{ \left( \frac{W_0}{\alpha} - Q_0 \right)^2 + \left( \frac{3 W_1}{\alpha} - Q_1 \right)^2 \ldots + \left( \frac{3^r W_r}{\alpha} - Q_r \right)^2 \right\}, \quad (6)$$

subject to the previous two equations for W and Q.

By zeroing the first derivatives, this equation leads to the following solutions, which can serve as initialization conditions:

$$\frac{W_0}{\alpha} - Q_0 = \frac{9^r}{1 + 9^r R} \left( \frac{W}{\alpha} - Q \right) \quad (7)$$

and, in the general case, for $x=0, 1 \ldots r-1$ (where r is the number of replica layers):

$$\frac{W_x}{\alpha_k} - \frac{Q_x}{3^x} = \frac{1}{9^x} \frac{9^r}{1 + 9^r R} \left( \frac{W}{\alpha_k} - Q \right). \quad (8)$$

where $$R = \frac{1 - \frac{1}{9^r}}{1 - \frac{1}{9}}.$$

This gives a generic initialization relation for a replica x as:

$$W_x = \frac{1}{9^x}\left(1 - \frac{1}{9}\right)\left(1 + \frac{1}{9^{r+1} - 1}\right)(W - \alpha_k Q) + \alpha_k \frac{Q_x}{3^x}, \quad (9)$$

with each $Q_x \in \{-1, 0, +1\}$.

For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The input generator 305 selects a set of inputs (and corresponding outputs) from the sets of inputs and outputs 340. In addition, in some embodiments, the input generator 305 breaks up the inputs into constituent values to be fed into the input layer of the network 330. For instance, for a network being trained for face recognition, the input generator might simply divide the pixels into several sections, or might perform computations based on the pixel values and feed these to the input layer (e.g., the percentage of red pixels in the image, the average red value of each pixel, or other statistics). That is, based on the input (e.g., an image), the input generator 305 might perform a set of computations in order to generate the inputs for the input layer of the network 330.

The network 330 processes the set of inputs through the network to obtain predicted outputs (i.e., outputs predicted according to the current state of the network 330). Each input propagates through the processing nodes of the network 330, with each layer of nodes receiving their one or more inputs and generating an output to pass to the next layer of nodes. In the final output layer, one or more nodes receives the outputs from the previous layer and generates the outputs of the network. In some embodiments, this processing entails, for each node, the linear component first computing a weighted sum of its input values (according to the current weight values 335), and then the non-linear activation function computing an output based on this weighted sum. In some embodiments, rather than directly sampling from the probability distribution for each weight for each of the inputs, some embodiments calculate the mean and variance for each weight and use these along with the node input values to compute an output mean and variance for each node.

The error calculator 310 then computes the error for the input set. In some embodiments, the error calculator 310 computes the error for each individual input as the network 330 generates its output. The error calculator 310 receives both the predicted output from the input generator 305 and the output of the network 330, and uses a loss function that quantifies the difference between the predicted output and the actual output for each input. Some embodiments compute this as a simple difference, or absolute value of the difference, between the two values; other embodiments compute the square of the differences, or other such measure. In addition, some embodiments sum or average the loss function value for each input in a set of inputs. This calculated error is passed to the error propagator 315 in some embodiments.

The error calculator 310 also adds any additional terms used to bias training towards the possible values for each weight and/or to ensure that a threshold percentage of the weights end up at the value 0. Examples of such loss function terms and their use in training are described in greater detail in U.S. patent application Ser. No. 15/815,222, filed Nov. 16, 2017, now issued as U.S. Pat. No. 11,113,603, and U.S. patent application Ser. No. 15/921,622, filed Mar. 14, 2018, both of which are incorporated herein by reference, as well as "Extremely Low Bit Neural Network: Squeeze the Last Bit Out with ADMM" by Leng, Cong, et al. (incorporated by reference above).

Next, the error propagator 315 back propagates (at 525) the error (including any constraint terms) to determine the rate of change of the error with respect to a change of each weight value. In typical training, the loss function is back propagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network.

Specifically, if L is the combined loss function (including any penalty terms), then the backpropagation computes, for each weight $w_{ik}$, the partial derivative $$\frac{\partial L}{\partial w_{ik}}.$$

Because the weights are isolated in a node's output computation as well as (typically) in any constraint terms, computing these partial derivatives is not difficult via application of the chain rule. In this sense, the loss function is a function in many-dimensional space (i.e., with the various weight coefficients being the many dimensions), and the nature of the function means that the effect of each weight value can be easily isolated for a given loss function value. Some embodiments, when using ADMM, alternate between modifying the weights based on such a typical loss function (that measures the difference between expected and actual outputs) and modifying the weights based on the constraint terms.

The weight modifier 325 adjusts the weight values based on the relative rates of change and a training rate factor. That is, the error propagator 315 provides, for each weight value $w_{ik}$, the partial derivative of the loss function with respect to that $w_{ik}$. These partial derivatives are used to update the weight values by moving the weight values in the direction opposite the gradient (to attempt to reduce the loss function value) by a particular amount, with a larger partial derivative for a particular weight (i.e., a component of the gradient) resulting in a greater change to that weight. The weight modifier 325 uses a training rate factor from the training parameters 350 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move. Specifically, for each weight value $w_{ik}$, with a learning rate r, the weight modifier updates this weight value using the following equation.

$$w_{ik(updated)} = w_{ik} - \left( r * \frac{\partial L}{\partial w_{ik}} \right) \qquad (10)$$

After the weights (and any other network parameters) are updated, the training system 300 can continue to perform additional training. Some embodiments use a minimization process (e.g., a stochastic gradient descent minimizer) to determine when to stop training the network. In some embodiments, the system 300 only stops training the network once (i) a large enough percentage of the weight values have been set to zero, (ii) all of the weights are set to one of their respective allowed candidate values, and (iii) the weights have changed by less than a threshold for a particular number of training iterations. In some embodiments, the input generator 305 determines whether to perform more training; in other embodiments, a different module (e.g., a module not shown in FIG. 3 makes this determination).

As mentioned, in some embodiments, each layer of nodes is assigned a set of allowed weight values during training. That is, after training, each weight value for each node in the layer will have an assigned weight value that is one of the possible weight values for the layer. In some such embodiments, the set has two possible values of $\{0, \alpha_k\}$ or three possible values of $\{0, \alpha_k, -\alpha_k\}$. The $\alpha_k$ for each layer can vary between layers. During training, the various techniques described above are used to bias and/or force the weights towards these two or three values and, in some embodiments, to ensure that at least a threshold percentage of the values come out to 0.

These techniques of (i) using at most three weight values per layer that can be represented as $\{0, 1, -1\}$ (quantization) and (ii) ensuring that at least a threshold percentage of the weight values are zero (sparsification) enables the design of networks that can be loaded onto and executed by specialized network inference circuits that use the network to process input data (e.g., images, sound clips, etc.) for which the network is trained. Specifically, certain neural network inference circuits are designed for networks that meet these constraints. Such neural network inference circuits are described in further detail below as well as in U.S. patent application Ser. No. 16/457,756, filed Jun 28, 2019, now issued as U.S. Pat. No. 11,049,013, which is incorporated herein by reference.

However, in some cases, a network will have some layers with a lower number of weight values than is typical for the rest of the network, and using these techniques can result in a loss of accuracy at these layers. Examples of layers where quantization and sparsification will often have such an effect include, e.g., the initial layer of a network and any 1×1 convolution layers. To ensure that these layers do not result in such a loss of accuracy, some embodiments replicate (e.g., duplicate, triplicate, etc.) the layer but use a different (though related) set of allowed weight values than the original version of the layer, then add together the outputs of the original and replica layers. This effectively increases the number of possible weight values for the layer, while still (i) ensuring that the requisite percentage of zero values is reached and (ii) enabling the network to be executed by a chip designed for only two or three possible input values per layer.

Figure 4:
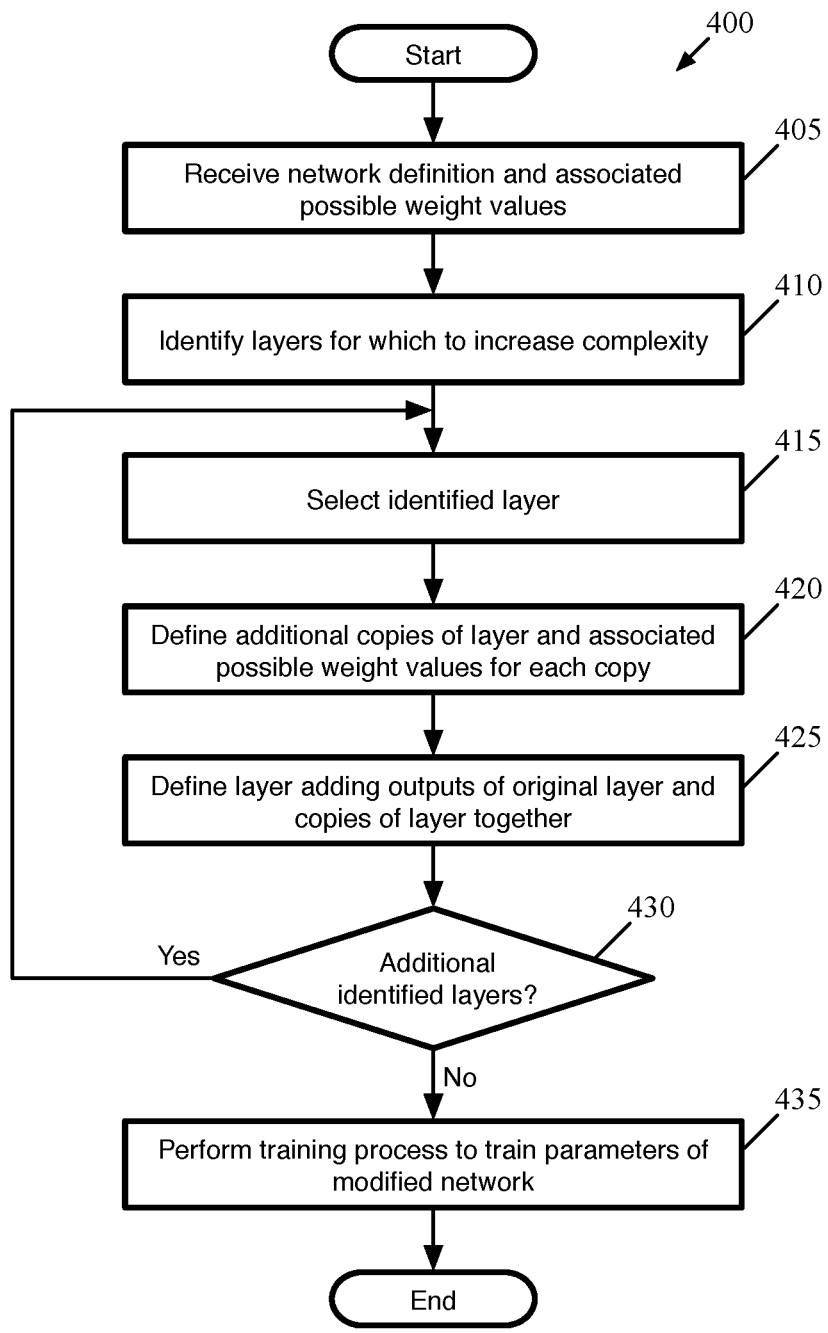
FIG. 4 conceptually illustrates a process of some embodiments to modify and train a network in order to functionally increase the number of possible weight values for at least some of the layers of the network.

FIG. 4 conceptually illustrates a process 400 of some embodiments to modify and train a network in order to functionally increase the number of possible weight values for at least some of the layers of the network. The process 400 increases the complexity of these layers of the network without altering the fundamental network structure, while maintaining sparsity (i.e., a high percentage of the weight values are still zero) and the ability to represent all the weight values of the modified network using the set $\{0, 1, -1\}$ (even when the effective number of different weight values for some of the layers is greater than three). The process 400 will be described in part by reference to FIG. 5, which illustrates how one node of an original layer is modified in a duplicate network layer and the resulting network portion.

As shown, the process 400 begins by receiving (at 405) a network definition and associated possible weight values for the network. In some embodiments, the network definition specifies the structure of the network (i.e., the number of nodes in each layer, which output values from one layer are received by each node of the next layer, the activation functions used by each layer, etc.). As mentioned, in some embodiments each layer has a set of two $\{0, \alpha_k\}$ or three $\{0, \alpha_k, -\alpha_k\}$ associated possible weight values. These $\alpha_k$ may be determined by randomly sampling a distribution (e.g., a Gaussian distribution), randomly assigning each weight value in the layer an initial value within a range and then selecting one of these as the associated $\alpha_k$ for the layer, training the network with floating point values and then assigning the $\alpha_k$ values for each layer based on these trained floating point values, or with other techniques.

Next, the process 400 identifies (at 410) layers for which to increase the complexity. In some cases, a network will have some layers with a lower number of weight values than is typical for the rest of the network, and using these techniques can result in a loss of accuracy at these layers. Thus, some embodiments identify layers that have less than a threshold number of weight values (e.g., 2000, 25,000, etc.). Some embodiments also begin training and determine for which layers the weights are not settling on one of their allowed values as quickly, identify which layers as trained by floating point values are likely to cause the most error as a result of quantization, or identify which layers are likely to have the most difficulty sparsifying. This identification may be performed by an automated process based on a setting, or a user specifying layers for which to increase the complexity.

In a convolutional neural network, often the initial layer and/or 1×1 convolutional layers will have fewer weight values than the other layers. The initial layer of a convolutional network that takes images as inputs often only has fewer weights because there are only three channels of input. A typical intermediate convolutional layer will have a number of input channels based on the number of filters in the previous layer (typically much larger than three), and thus have more weight values. As an example, a 3×3 filter for three input channels (and 0 padding) will have 27 weight values, but a 3×3 filter for 72 input channels will have 648 weight values. 1×1 convolutional layers are used to modify the channel dimension of the filters for the subsequent layer. Because the filters in such a layer are 1×1 filters, they will have far fewer weight values per filter (and thus per layer).

To ensure that these layers do not result in a loss of accuracy for the network, especially when imposing sparsity requirements, some embodiments replicate (e.g. duplicate, triplicate, etc.) the layer but use a different (though related) set of allowed weight values than the original version of the layer, then add together the outputs of the original and replica layers. This effectively increases the number of possible weight values for the layer, while still (i) ensuring that the requisite percentage of zero values is reached and (ii) enabling the network to be executed by a chip designed for only two or three possible input values per layer.

Figure 5:
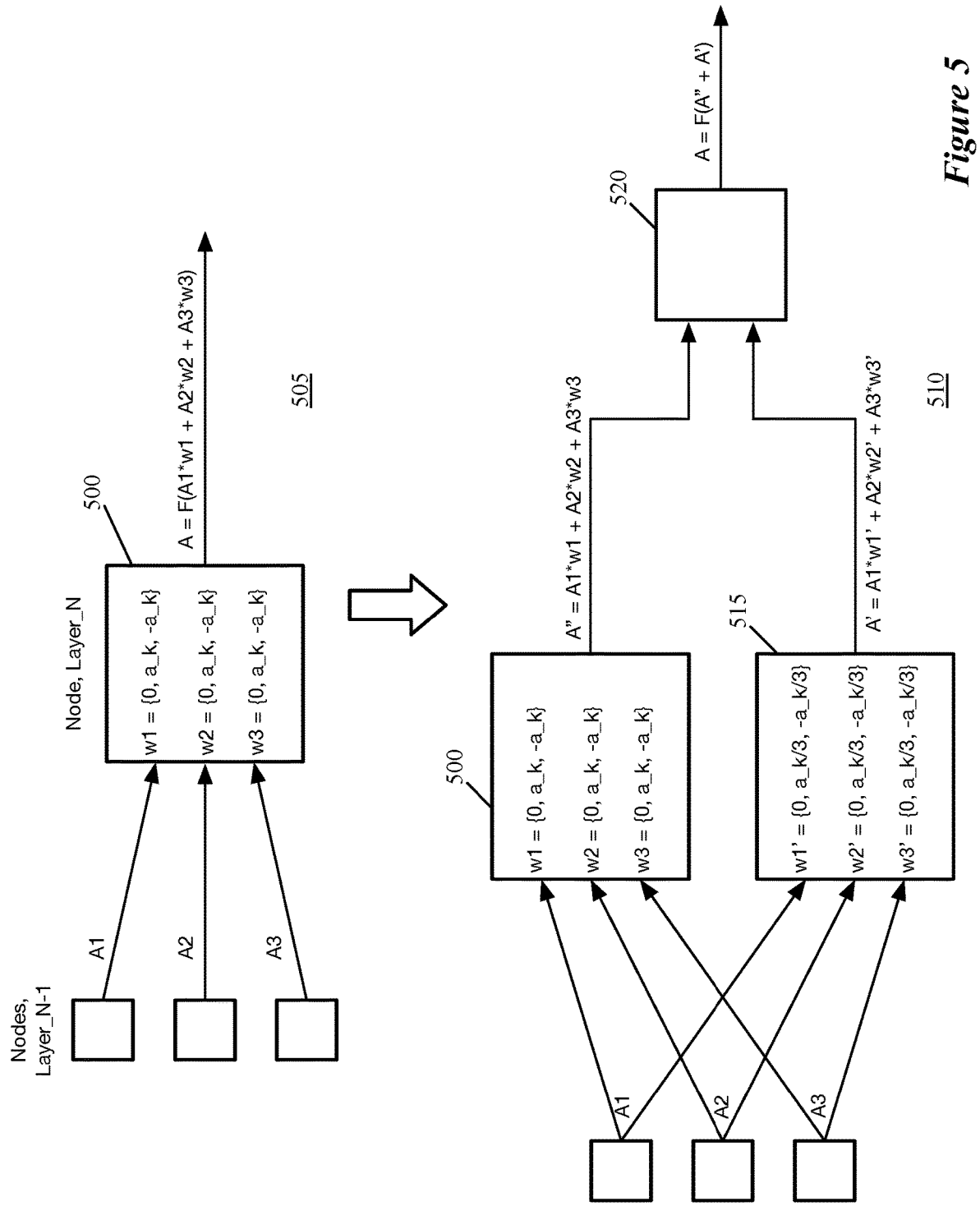
FIG. 5 illustrates how one node of an original layer is modified in a duplicate network layer and the resulting network portion.

Thus, the process 400 selects (at 415) one of the identified network layers. Different embodiments may select the identified layers in different orders (e.g., from the start of the network to the end, etc.). FIG. 5, as mentioned, illustrates the increase in complexity of a single node of such a layer over two stages 505-510. The first stage 505 illustrates the original node 500 (i.e., as received by the process 400). As shown, this node 500 is one of the nodes of Layer N and receives three input values A1, A2, and A3 (from nodes in a previous layer N-1) and has three corresponding weights w1, w2, and w3. Each of the three weights can be assigned (through training) a value in the set $\{0, \alpha_k, -\alpha_k\}$. The node outputs a value A that is a function F of the linear combination of the inputs A1, A2, and A3 with the weights w1, w2, and w3. In this example, F represents a combination of the bias and scale constants for the node as well as the non-linear activation function. It should be understood that a typical convolutional neural network node will have many more input values (and thus many more weight values) than this, but for simplicity the node 500 is shown with only three inputs.

The process 400 defines (at 420) one or more additional copies of the selected layer and the associated possible weight values for each copy. In some embodiments, if the original layer has a set of associated possible weight values $\{0, \alpha_k, -\alpha_k\}$, then the second copy of the layer is assigned possible weight values of $\{0, 3\alpha_k, -3\alpha_k\}$ or $\{0, \alpha_k/3, -\alpha_k/3\}$. If a third copy of the layer is used, then this third copy is assigned possible weight values of $\{0, 9\alpha_k, -9\alpha_k\}$ or $\{0, \alpha_k/9, -\alpha_k/9\}$. Each node in each of the replica layers receives the same input as its corresponding node in the original layer, and each copy of the nodes generates its output separately. Similarly, if the original layer has two possible associated weight values of $\{0, \alpha_k\}$, then the possible weight values for the duplicate layer are $\{0, 2\alpha_k\}$ or $\{0, \alpha_k/2\}$, the possible weight values for the triplicate layer are $\{0, 4\alpha_k\}$ or $\{0, \alpha_k/4\}$, etc.

In some embodiments, using smaller values for each replica layer (e.g., $\alpha_k/3$, then $\alpha_k/9$, etc.) rather than larger values (e.g., $3\alpha_k$, $9\alpha_k$, etc.) provides a benefit in that it can avoid replication for certain nodes or layers. During sparsification, it tends to be easier to force the smallest values to zero and potentially remove these values. That is, the precision provided by the smallest values is the least likely to be needed. Therefore, the likelihood of removing a replica layer is greatest when those replica layers are the smallest weight values (e.g., the $+/-\alpha_k/9$ values) rather than the largest values (e.g., the $+/-9\alpha_k$).

The process 400 also defines (at 425) a layer (i.e., a set of nodes) adding together the outputs of the original layer and each copy of the layer. Each node in the original layer will have a corresponding node in each of the copies of the layer. This additional layer includes a node for each of the original-layer nodes that adds together the output of the original-layer node with the outputs of each of its corresponding nodes in the duplicate/triplicate/etc. layers. The effective result in the case of ternary weights is that each node has an effective set of 9 possible weight values if the layer is duplicated, 27 possible weight values if the layer is triplicated, etc. Similarly, in the case of binary weights, each node effectively has 4 possible weight values if the layer is duplicated and 8 possible weight values if the layer is triplicated.

The second stage 510 of FIG. 5 illustrates the duplication of the node 500. As shown in this stage, the node 500 still receives the three inputs A1, A2, and A3, and has weight values w1, w2, and w3 that can each have possible values in the set $\{0, \alpha_k, -\alpha_k\}$. In addition, a duplicate copy 515 of this node has been defined, that also receives the three inputs A1, A2, and A3. This node 515 has three weight values w1', w2', and w3', each of which can be assigned a value in the set $\{0, \alpha_k/3, -\alpha_k/3\}$. The original node 500 is now modified to only compute an output value A" that is a linear combination the three inputs A1, A2, and A3 with the three weights w1, w2, and w3, and the duplicate node 515 also outputs a linear combination A' of these three inputs with weights w1', w2', and w3'. In some embodiments, these nodes (including the original node) no longer apply the bias, scale, or non-linear activation function.

Instead, an additional node 520 receives both A" and A' (the outputs of the original node 500 and the duplicate node 515), adds these values together, and applies the function F (representing the bias, scale factor, and non-linear activation function) to this sum to compute the new output value A. In addition, if any batch normalization is performed for the layer, some embodiments apply this as part of the node 520. Other embodiments apply bias, scale, and/or non-linear activation functions to the original node, any replica nodes, and the addition node. In addition, as described further below, because the neural network inference circuit of some embodiments requires quantization (e.g., to a 4-bit value) of the output values of each effective layer (i.e., of A' and A", as well as the eventual output value A), some embodiments introduce additional scaling and/or de-scaling for the replica layers to ensure that these intermediate values are added together correctly during inference while minimizing the loss of precision.

After defining duplicate/triplicate/etc. layers for the currently selected layer, the process 400 determines (at 430) whether there are any additional layers for which to increase the complexity. If additional layers remain, the process 400 returns to 415 to select the next layer. Otherwise, the process performs (at 435) the training process to train the parameters of the modified network. The process 400 then ends. As described above, different embodiments may use different approaches to training the weight values. Some embodiments allow the weight values to be modified on a spectrum (i.e., using a floating point value) rather than constrained to a set of allowed candidate values during the course of initial training, then use additional constraint terms to force the weight values towards the allowed candidate values during subsequent training. In addition, some embodiments perform sparsification of the network (to ensure that the network includes a threshold number of zero weights), including sparsification of the various replica layers. Additional details regarding the training of some embodiments is provided below.

In addition, different embodiments use different methods to train each set of corresponding weight values. A set of corresponding weight values is a particular weight value for an original node as well as its corresponding weight value in the duplicate/triplicate/etc. node (i.e., w1 and w1' in the example of FIG. 5). Some embodiments train these as a single value, adding the two values together and forcing the trained value towards one of 9 (or 27, etc.) possible values. Referring to the example, this would be training w1+w1' to be one of the set of values $\{0, \alpha_k/3, 2\alpha_k/3, \alpha_k, 4\alpha_k/3, -\alpha_k/3, -2\alpha_k/3, -\alpha_k, -4\alpha_k/3\}$. In some cases, this allows the training process to explore the full space of possible values more easily as compared to other embodiments that train each corresponding weight value within such a set independently, forcing each separate weight value towards one of its 3 possible values (i.e., training w1 to be one of $\{0, \alpha_k, -\alpha_k\}$ and training w1' to be one of $\{0, \alpha_k/3, -\alpha_k/3\}$. However, when requiring a certain threshold percentage of the weight values to be zero, some embodiments train each corresponding weight value within a set independently so as to increase the likelihood for each individual value being set to zero.

In addition to enabling certain layers (e.g., layers with a lower number of weight values) to include more complexity and therefore avoid losing network accuracy), the use of replica layers also allows for an increase in the percentage of weight values set to 0 in some embodiments. Because the non-zero weight values can provide more fine-grained analysis, more of the weight values can equal 0 in some embodiments. In addition, at a conceptual level, by replicating these layers, the data flow through the network becomes more laminar, rather than having the data compress down and expand.

However, in some embodiments, the simplest technique for training the weights independently during backpropagation may result in the set of weights for each replica layer (the weight tensors) being the same (other than the scaling factors being replicas). That is, each individual weight value in the original layer (factoring out the $\alpha_k$ so that each value in the weight tensor is in the set $\{-1, 0, 1\}$) will be the same as its corresponding weight value for each of the replica layers (again factoring out the $\alpha_k/3$, $\alpha_k/9$, etc. so that each value in each of the weight tensors is in the set $\{-1, 0, 1\}$). This is because (at least if the necessity for value quantization for specific hardware is ignored), backpropagation computes the same loss gradient for each of the corresponding weights. Thus, training will push the corresponding weights to the same ternary values, and no additional weight precision will be achieved.

Thus, some embodiments use a replication strategy for the weights that is based on a conversion to balanced ternary (that is, by approximating a real value by a multidigit, balanced ternary number). Such an approach allows for exploitation of the increased precision provided by additional ternary weights. Given a sufficient number of ternary digits, a floating-point value can be approximated to arbitrarily high accuracy. Starting with a floating-point value F and a scale a that satisfies the constraint $|F|/\alpha < 1/(1-1/3) = 3/2$, F can be approximated by:

$$\frac{F}{\alpha} = Q_0 + \frac{1}{3}Q_1 + \frac{1}{9}Q_2 + \frac{1}{27}Q_3 + \dots \frac{1}{3^{n-1}}Q_{n-1} + O(3^{-n}), \quad (11)$$

where each $Q_i$ is a ternary digit (i.e., an element of the set $\{-1, 0, 1\}$. Some embodiments determine the ternary digits using the following procedure for converting a real number to balanced ternary:

$R_0 = F/\alpha$
$Q_0 = \text{round}(R_0)$
Remainder $R_1 = 3(R_0 - Q_0)$
$Q_1 = \text{round}(R_1)$
Remainder $R_2 = 3(R_1 - Q_1)$
. . .
Remainder $R_{n-1} = 3(R_{n-2} - W_{n-2})$
$Q_{n-1} = \text{round}(R_{n-1})$
Terminate (all digits have been determined)

At each iteration, this process approximates the remainder $R_i$ by $Q_i$, the computes the remainder $R_{i+1}$. The initial remainder Ro is the original quantity $F/\alpha$ (the value for which the ternary expansion is being computed). In converting to balanced ternary, each digit is computed using the round function, which rounds to the nearest ternary digit (i.e., $\{-1, 0, 1\}$) rather than the floor function that is used in conversion to an unbalanced numeral system (e.g., decimal).

To apply the above concept to the weight tensors of a replicated layer, a set of ternary digits Q are a set of corresponding weights (i.e., one weight in each layer, occupying the same position in each of the weight tensors). However, applying this conversion procedure to the training of the weights, the remainders $R_i$ would change discontinuously with each update to Q (i.e., to the weights), which would be disruptive to the training. Thus, some embodiments make the remainders $R = (R_0, R_1, \dots, R_{n-1})^T$ the learned parameters, rather than the ternary digits Q. According to the conversion procedure, the remainders are required to satisfy the constraint $$R_i - \frac{1}{3}R_{i+1} = Q_i,$$

where $Q_i$ is a tensor of ternary values. By defining a value $$\hat{W}_i(R) = R_i - \frac{1}{3}R_{i+1},$$

this constraint can be expressed as $\hat{W}_i(R) - Q_i = 0$.

From this expression, it can be seen that $\hat{W}_i(R)$ is the normalized weight tensor for component layer i that is needed to constrain to ternary values. In the following discussion, $\hat{W}_i$ refers to the normalized weight tensor $\hat{W}_i = \hat{W}_i/\alpha_i$ where the scales for the component layers of a replicated layer are related by $\alpha_i = \alpha/3^i$.

In the conversion procedure, the remainders were computed using $R_{i+1} = 3(R_i - Q_i)$. The constraint term just described encourages the learned remainders, $R_i$, to satisfy this relationship. The other step in the conversion procedure of some embodiments computes the ternary digits using $Q_i = \text{round}(R_i)$. This is accomplished in some embodiments by finding the $Q_i$ that minimizes the ADMM quadratic-penalty term:

$$L_i^{quadratic\ penalty} = \|\hat{W}_i(R) - Q_i\|^2. \quad (12)$$

When the quadratic penalty terms for the original layer and all the replica layers are combined and the Lagrange-multiplier term is included, the overall ADMM penalty loss of some embodiments becomes:

$$L_{penalty} = \frac{\rho}{2}\sum_{i=0}^{n-1}\|\hat{W}_i + \lambda_i - Q_i\|^2. \quad (13)$$

This illustrates a choice to use the same coefficient, ρ, for the quadratic penalty for each layer, irrespective of whether the term applies to the most-significant or least-significant ternary digit in a set of replica layers or to a non-replica layer. Some embodiments use smaller coefficients for replica layers for less significant digits. However, when a global-sparsity constraint is imposed, then it would be cheaper to project weights in the less significant layers to zero, and so sparsification would produce 100% sparsity in those layers, effectively removing all of the replica layers (the sparsification operations of some embodiments are described further below). Nevertheless, even with the use of the same coefficient for the each of the layers, the operation will typically result in higher sparsity (more zero values) for less significant digits. Weights in these smaller-weight replica layers will have smaller quality-loss gradients and be less able to resist the sparsity-constraint forces. A further justification for using the same coefficient ρ for all layers is that the implementation cost of a layer is the same regardless of the significance of the digits implemented. Therefore, this global coefficient puts all of the replica layers on an equal footing and lets the accuracy loss function determine which weights and layers are needed.

This strategy (training the remainders be the learned parameters rather than the weights $\hat{W}=(\hat{W}_0, \hat{W}_1, \ldots, \hat{W}_{n-1})^T$ essentially amounts to a change of variables from $\hat{W}$ to R. In matrix form, the weights are computed in terms of the remainders by $\hat{W}=AR$, where the matrix A is given by:

$$A = \begin{pmatrix} 1 & -\frac{1}{3} & 0 & \cdots & 0 \\ 0 & 1 & -\frac{1}{3} & \cdots & 0 \\ \vdots & \vdots & \vdots & \ddots & \vdots \\ 0 & 0 & \cdots & 1 & -\frac{1}{3} \\ 0 & 0 & \cdots & 0 & 1 \end{pmatrix} \quad (14)$$

Inverting this relationship, the remainders are given in terms of the weights by $R=A^{-1}\hat{W}$, where the inverse matrix is given in closed form as:

$$A = \begin{pmatrix} 1 & \frac{1}{3} & \frac{1}{9} & \cdots & \frac{1}{3^{n-1}} \\ 0 & 1 & \frac{1}{3} & \cdots & \frac{1}{3^{n-2}} \\ \vdots & \vdots & \vdots & \ddots & \vdots \\ 0 & 0 & \cdots & 1 & \frac{1}{3} \\ 0 & 0 & \cdots & 0 & 1 \end{pmatrix}. \quad (15)$$

Because the remainders R are the learned parameters, the gradient of the quality loss function (i.e., the loss function that accounts for differences between expected and actual outputs) is taken with respect to R, as follows:

$$(\nabla_R L)_i = \frac{\partial L}{\partial R_i} = \sum_{j=0}^{n-1} \frac{\partial L}{\partial \hat{W}_j} \frac{\partial \hat{W}_j}{\partial R_i} = ((\nabla_{\hat{W}} L)^T A)_i. \quad (16)$$

In the absence of any quantization (i.e., value or weight quantization), the loss is a function of only the total weight $R_0$: $L=L(R_0)$. In this case, the graident is:

$$(\nabla_R L(R_0))_i = \frac{\partial L(R_0)}{\partial R_i} = \quad (17)$$

$$\sum_{j=0}^{n-1} \frac{\partial L(R_0)}{\partial R_0} \frac{\partial R_0}{\partial \hat{W}_j} \frac{\partial \hat{W}_j(R_0)}{\partial R_i} = \sum_{j=0}^{n-1} \frac{\partial L(R_0)}{\partial R_0} (A^{-1})_{0j} A_{ji} = \frac{\partial L(R_0)}{\partial R_0} \delta_{0i}$$

For i>0, therefore, the gradient of the loss function is 0. That is, without any quantization, only $R_0$ has a nonzero gradient and is updated by training. Starting with all the $R_i=0$ for i≠0, then these components of R remain zero. Given $\hat{W}=AR$ only $\hat{W}$ changes. Without weight quantization, the $\hat{W}_i$ for less-significant digits do not know what direction to move and thus remain at zero. Once weight quantization is used, the quality loss gradient still only updates $R_0$, but the weight-quantization gradient causes the less-significant remainders to become nonzero. This causes the less-significant components of $\hat{W}$ to become nonzero and move toward the values computed by the balanced-ternary conversion algorithm shown above.

To train the network using the remainders $R=(R_0, R_1, \ldots, R_{n-1})^T$ as the learned parameters, some embodiments first initialize $R_9$ as F/α, and $R_i=0$ for i>0. During forward propagation, the training system computes $\hat{W}=AR$, and the output of the composite layer (i.e., the outputs of the original layer and all of the replicas after element-wise summation and post-processing operations (bias, scaling, activation function, batch normalization, etc.). This output is given as:

$$y = \sum_{i=0}^{n-1} ValueQuant\left(\frac{a}{3^i} \hat{W}_i * x\right). \quad (18)$$

For backpropagation, some such embodiments use the gradient of the loss function with respect to R rather than the weights. Given a loss gradient with respect to $\hat{W}$, the corresponding gradient with respect to R is given by:

$$\nabla_R L = A^T \nabla_{\hat{W}} L, \quad (19)$$

which leads to a change in R of:

$$\nabla R = -\eta A^T \nabla_{\hat{W}} L, \quad (20)$$

where η is the learning rate. In forward propagation, some embodiments use the linear transformation W=AR to compute the new value of $\hat{W}$ after the gradient step, so that the change in $\hat{W}$ is:

$$\nabla \hat{W} = -\eta A A^T \nabla_{\hat{W}} L. \quad (21)$$

Thus, the result of using R instead of W as the set of learned parameters for training is that the gradient step is multiplied by $AA^T$, which is given by the matrix:

$$AA^T = \begin{pmatrix} \frac{10}{9} & -\frac{1}{3} & 0 & \cdots & 0 & 0 \\ -\frac{1}{3} & \frac{10}{9} & -\frac{1}{3} & \cdots & 0 & 0 \\ \vdots & \vdots & \vdots & \ddots & \vdots & \vdots \\ 0 & 0 & \cdots & -\frac{1}{3} & \frac{10}{9} & -\frac{1}{3} \\ 0 & 0 & \cdots & 0 & -\frac{1}{3} & 1 \end{pmatrix} \neq i***. \quad (22)$$

Given that $AA^T$ is not the identity matrix, the change of variables from $\hat{W}$ to R has an effect. Because $AA^T$ has off-diagonal components, when the quantization constraint $\hat{W}_i - \hat{Q} = 0$ is not satisfied, the training is able to directly communicate the problem to the "adjacent" component tensors $\hat{W}_{i+1}$, which are moved in a direction opposite the direction that $\hat{W}_i$ is moved.

For sparsification, some embodiments identify a sparsification cost for each weight in the network, and set to zero the weights with the lowest sparsification costs in order to reach a predefined sparsity percentage $s_p$ (e.g., 75%). Without replication, assuming the network includes N weights, then the weights are ordered based on the sparsification cost, and the first $s_pN$ weights are set to zero. This solves the optimization problem given by:

$$\min\{c_1 + c_2 + \ldots + c_{i_m}\} \text{ subject to } m = s_pN, \quad (23)$$

where $c_i$ is the sparsification cost of the $i^{th}$ weight and $i_m$ is the index of the last sparsified weight (the weight set to zero with the highest cost for doing so). Without replication, each weight is either kept as is or set to zero. The sparsification cost of a floating point weight (without any replication) is simply the distance of that value from zero. Thus, for example, a weight with a value of 0.62 is less likely to be set to 0 than a weight with a value of 0.11.

With replication, as described above, each weight is represented with multiple replica weights at different scales (i.e., $\alpha_k$, $\alpha_k/3$, $\alpha_k/9$, etc.). In this formulation, each weight W is composed of the original layer weight $W_0$ in addition to one or more replica weights $W_1 \ldots W_r$ as described above with respect to the quantization process. In addition, as noted, the quantized weight Q is given as $$Q = Q_0 + \frac{Q_1}{3} + \frac{Q_2}{9} + \ldots + \frac{Q_x}{3^x} + \ldots + \frac{Q_r}{3^r}.$$

The sparsification cost for modifying a given $Q_x$ to be zero is given by the following:

$$\left[\left(\frac{W}{\alpha} - Q\right) + \frac{Q_x}{3^x}\right]^2 - \left(\frac{W}{\alpha} - Q\right)^2 = \quad (24)$$

$$\frac{Q_x}{3^x}\left[2\left(\frac{W}{\alpha} - Q\right) + \frac{Q_x}{3^x}\right] = \frac{Q_x^2}{3^{2x}} + 2 \cdot \frac{Q_x}{3^x}\left(\frac{W}{\alpha} - Q\right).$$

For $Q_x = 0$, this cost is zero (i.e., there is no cost to sparsifying a weight that is already set to zero). When $Q_x = \{1, -1\}$, the term $3^{2x}$ prevails $$\left(\text{if } \left|\frac{W}{\alpha} - Q\right| < 1\right),$$

indicating (in accordance with intuition) that the sparsification cost of a replica weight depends on to which replica layer that weight belongs. As mentioned above, an advantage of using $\alpha_k/3$, $\alpha_k/9$, etc. as the replica scaling rather than $3\alpha_k$, $9\alpha_k$, etc. is that the sparsification cost decreases for each subsequent replica in the former formulation.

If there are R-1 replica layers (plus the original layer) per weight, then to reach the sparsification percentage, $s_pNR$ of the individual quantized weight values should be set to zero. Using more non-zero weights may allow the total quantized weight Q to be closer to the floating point weight value, but with diminishing returns. The optimization problem for sparsification that is given above now accounts for both (i) the optimal number of replica layers to use and (ii) for each weight W, how many of its individual replica quantized weights should be set to 0.

The above discussion focuses primarily on training of the various replica layers of weights, while ensuring that the weight values are quantized (to ternary weight values) and sparsified (enough weight values set to zero). This enables execution of the network by a neural network inference circuit of some embodiments with ternarization and sparsity requirements. When implemented on such a neural network inference circuit of some embodiments, the original layer and each replica layer are all treated as separate layers, though the same set of input values are stored for use in each of the multiple copies of the layer. Each of the individual copies of the layer are computed separately, and then the chip combines the outputs of the corresponding sets of nodes using an element-wise operation to compute the output values that are stored as inputs for the next layer.

Such a neural network inference circuit is part of an integrated circuit in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric).

Figure 6:
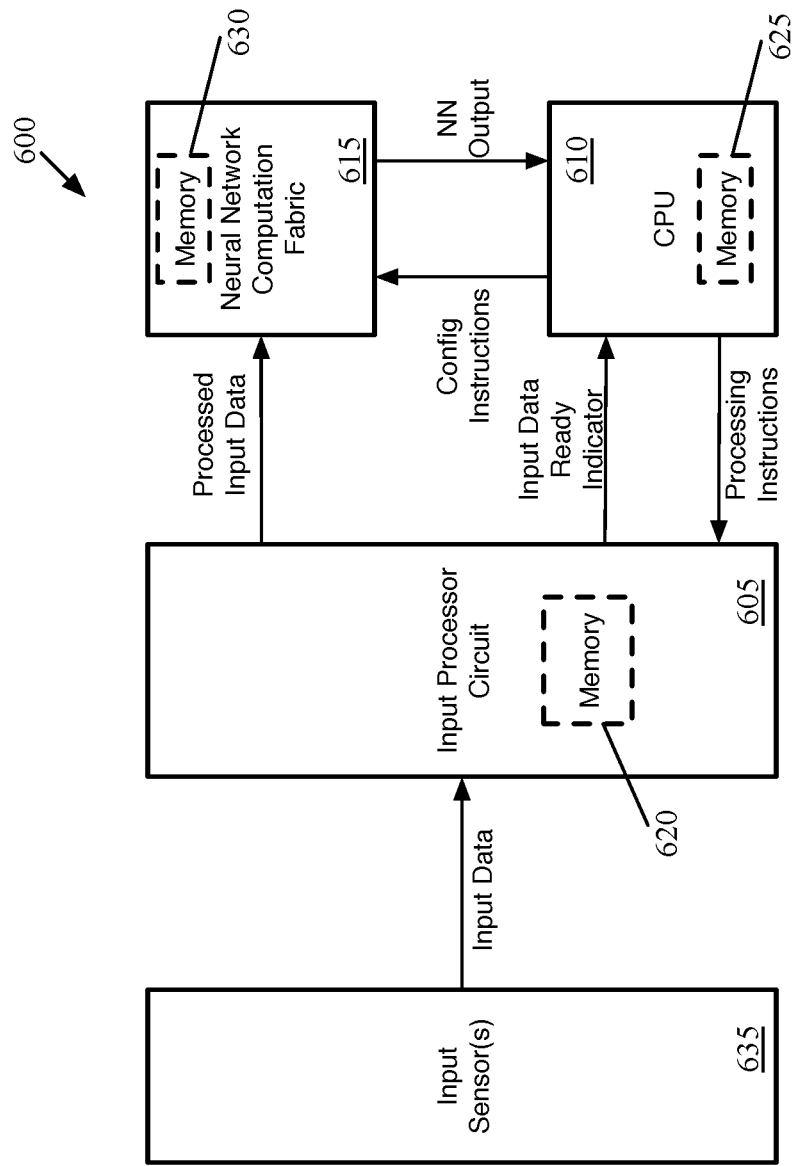
FIG. 6 conceptually illustrates an integrated circuit of some embodiments.

FIG. 6 conceptually illustrates such an IC 600 of some embodiments. As shown, the IC includes an input processor circuit 605, a microprocessor (CPU) 610, and a neural network computation fabric 615. Each of these components 605-615 also has corresponding memory (e.g., random access memory (RAM)) 630. In addition, in some embodiments, the IC is integrated into a device (such as an Internet of Things (IOT) device) with one or more input sensors 635. These input sensors can include cameras (e.g., for capturing video images on which the neural network computation fabric 615 performs face or object recognition, etc.), microphones (e.g., for capturing audio on which the neural network computation fabric 615 performs voice recognition, speech processing, etc.), or other types of input sensors. In other embodiments, the input sensors 635 are located on a separate device that is linked with the IC 600.

In some embodiments, at bootup of the IC 600, the CPU 610 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 615 to write the weight values and other data to its memory 630. In addition, the CPU 610 loads the neural network program instructions for the computation fabric to its own memory 625. These instructions are applied by the computation fabric 615 to input data in order to execute the neural network. These runtime instructions include, e.g., indications as to which pre-loaded sets of instructions to use for each set of calculations, etc.

The input processor circuit 605 receives input data (e.g., still images or video frames, sounds, etc.) from the input sensor(s) 635, and processes these according to processing instructions received from the CPU 610. The CPU 610 stores in its memory instructions for the input processor circuit to prepare input data for the computation fabric 615 as well as the neural network program instructions. These instructions identify, in some embodiments, any sort of initial processing to apply to the raw data (e.g., decompression of compressed data, etc.) as well as how to arrange the data to be provided to the computation fabric 615. For an image, e.g., these instructions might specify the order in which the pixels should be arranged and streamed to the computation fabric 615, so that the computation fabric stores this data in the appropriate locations of its memory 630 for subsequent operations. The input processor circuit 605 also sends signals to the CPU 610 to indicate when it has fully buffered an input (e.g., a frame of video) and when the input is prepared to be sent to the computation fabric 615.

In addition to instructing the input processor circuit 605 how and when to provide input data to the computation fabric 615, the CPU 610 provides the neural network program instructions to the computation fabric. In some embodiments the CPU 610 provides these instructions in stages (e.g., one layer or portion of a layer at a time). Once the final output of the neural network is computed, the fabric 615 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, α, and −α for each layer of the network), and/or that at least a particular percentage of the weight values be equal to zero.

Figure 7:
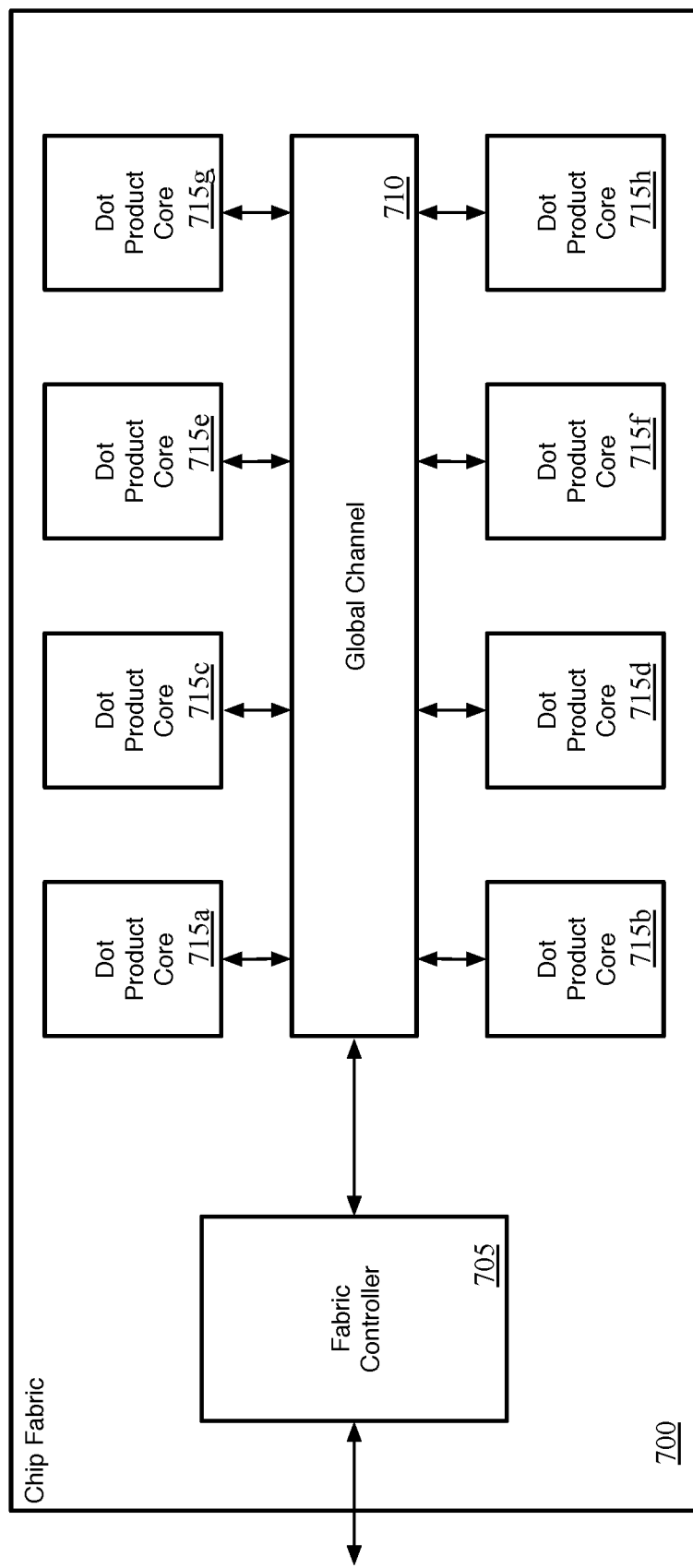
FIG. 7 conceptually illustrates the neural network computation fabric of some embodiments.

FIG. 7 conceptually illustrates the neural network computation fabric 700 (also referred to as the chip fabric) of some embodiments. The chip fabric 700 of some embodiments includes a fabric controller 705, a global channel 710, and a set of dot product cores 715*a*-*h*. The connections between the various components 705-715 represent the flow of both control data (e.g., configuration data for a particular neural network layer) and computation data at runtime in some embodiments.

The fabric controller 705 is responsible for managing the operation of the rest of the chip fabric 700 (e.g., the dot product cores 715) in some embodiments. The fabric controller 705 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 715), etc. The instructions managed by the fabric controller 705 are configured at compile time, in some embodiments, based on the parameters of the network being implemented by the chip fabric 700. In some embodiments, the fabric controller 705 interacts with the microprocessor of the IC as well (i.e., the fabric controller 705 handles the communication with the CPU 610 shown in FIG. 6).

The chip fabric also includes numerous dot product cores 715 as well as a global channel 710 that connects the cores, with these data processing circuits configured by the fabric controller (and a set of hierarchical control circuits, in some embodiments). These data processing circuits 710 and 715 operate to compute neural network operations in an efficient, low-power manner, according to the configuration data provided by the control circuits.

The dot product cores 715*a*-*h* include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs.

The global channel 710 is responsible for providing a communications bus for control and computation data between the fabric controller 705 and the cores 715, as well as from one core to another. The global channel 710, among other operations, accumulates partial dot products from multiple cores when computing dot products that require more computations than can be performed in a single core, and performs post-processing on these dot products. In addition, the global channel 710 carries activations (i.e., computation node outputs) after post-processing for storage (and for use as inputs to subsequent computation nodes) in other cores 715. In some embodiments, the global channel 710 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 710, as described further below.

The chip fabric 700 of some embodiments computes numerous neural network computation nodes simultaneously, with the computation for one node often spread across multiple cores (and subsequently the global channel). In some cases, if a neural network layer is small enough, then computation for that layer may be confined to a single core 715. However, if multiple cores are used for a given layer (any number of cores may be used in some embodiments), then each dot product computed for that layer is spread across all of the cores 715 in use.

That is, for a dot product computed across more than one core 715, each of these cores computes a partial dot product from a subset of the input values and weight values for the node, then provides these partial dot products to the global channel 710. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 710. In some cases, however (e.g., for dot products with a very large number of terms or using larger than standard activation values, or when filters have too many nonzero weight values), each core 715 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 710 aggregates these partial dot products to compute the complete dot product for each node, then applies various post-processing functions (e.g., the bias, scale, and non-linear activation functions) to compute the output of each node.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores to be stored as inputs for the next computation layer.

Figure 8:
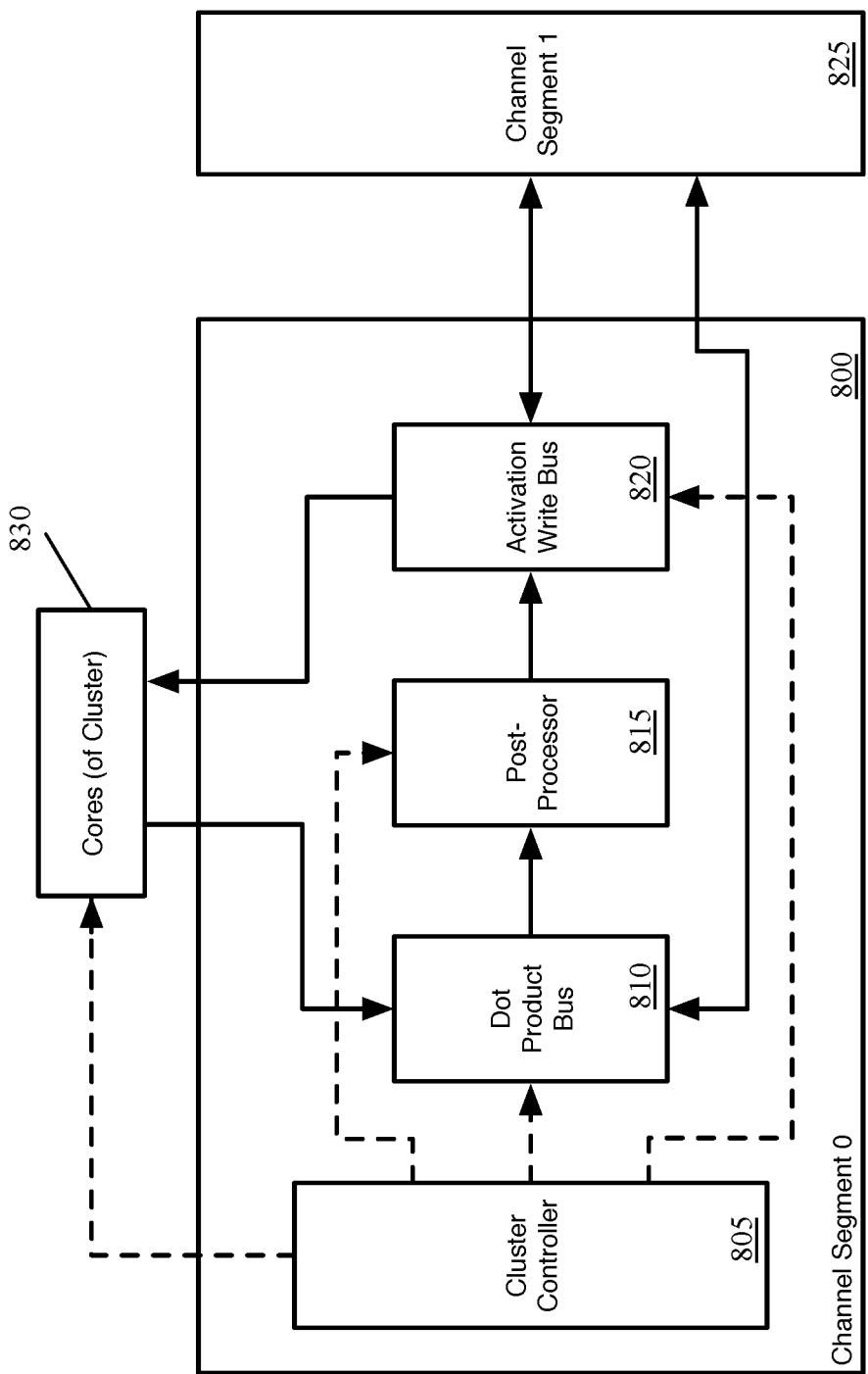
FIG. 8 conceptually illustrates the circuit blocks of a channel segment of some embodiments.

FIG. 8 conceptually illustrates the circuit blocks of a channel segment 800 of some embodiments. The channel segment 800 includes a cluster controller 805, a dot product bus 810, a post-processor 815, and an activation write bus 820 (also referred to as an output bus). In addition to the channel segment 800, the figure also illustrates an additional channel segment 825 and the cores 830 of the local cluster for the channel segment 800, as the circuit blocks of the channel segment 800 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 830 to the post-processor 815 for pooling nodes or element-wise operators, is not shown.

The cluster controller 805 configures the dot product bus 810, post-processor 815, and activation write bus 820 as per the configuration instructions received from the fabric controller in some embodiments. For the dot product bus 810, this configuration data specifies, in some embodiments, (i) which partial dot products are to be added together as part of the same neural network computation node and (ii) to which post-processing unit each aggregated dot product is sent (the post-processor 815 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 815, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 820, the configuration data indicates to which cores each output value is to be delivered, in some embodiments.

As mentioned, the solid lines indicate the flow of neural network computation data, for a node in a convolutional or fully-connected layer. The cores 830 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 810, which aggregates the partial dot products from the cores 830 of the local cluster. The dot product bus 810, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 810 spans all of the channel segments, and the dot product bus lanes in each channel segment aggregate the partial dot products from the cores of its local cluster. The dot product bus 810 in the channel segment 800 also exchanges locally-aggregated dot products with its neighboring segments for further aggregation if needed (i.e., if the source cores for the dot product computation span multiple clusters). In this case, the channel segment 800 only has one neighboring segment, but internal channel segments will have two such neighboring segments. The configuration data from the cluster controller 805 specifies whether to send these dot products in one direction or the other along the global channel for each dot product bus lane, or to aggregate the dot products from the neighboring channels locally, depending on where post-processing will occur for each dot product.

The post-processor 815 includes numerous post-processing units that receive the dot products from their corresponding dot product bus lane and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 820 receives the computation node activation outputs from the post-processing units and carries these outputs back to the cores 830, to be stored in the memory of the core and used as inputs for the computation nodes of the next layer of the neural network. The activation write bus connects to the cores 830 in the local cluster as well as the activation write bus in the neighboring channel segment 825. As with the dot product bus 810, the activation write bus 820 of some embodiments includes lanes, with each post-processing unit of the post-processor 815 sending its output to a different one of these lanes.

In some embodiments, the output values may be computed by the post-processor 815 in one cluster but carried by the activation write bus 820 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 820 also includes a right shift circuit for each core that is used to align the output values for the core, in order for the values to be stored in contiguous blocks within the core RAM.

Figure 9:
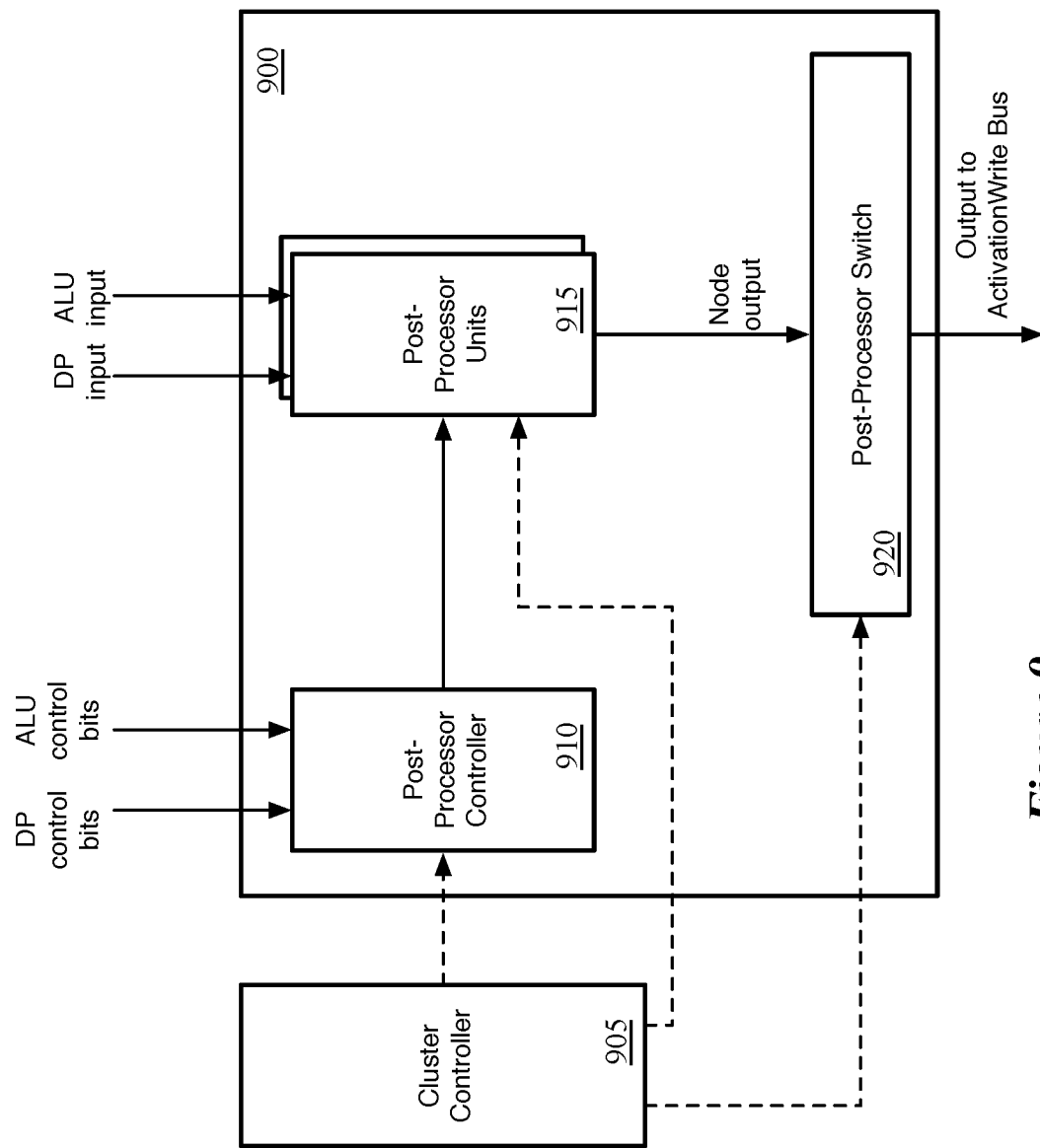
FIG. 9 conceptually illustrates the post-processing circuit block for a channel segment of some embodiments, along with the local cluster controller that provides configuration data to this post-processor.

Now that the primary circuit blocks of the global channel have been introduced, some of these circuits of some embodiments will be explained in greater detail. FIG. 9 conceptually illustrates the post-processing circuit block 900 for a channel segment of some embodiments, along with the local cluster controller 905 that provides configuration data to this post-processor 900. As shown, the post-processing circuit block 900 includes as sub-blocks a post-processor controller 910, a set of post-processing units 915, and a post-processor switch 920. The cluster controller 905 provides configuration data to each of these sub-blocks in order to synchronize operations, and to configure the post-processing units 915 with the correct bias and scale factors as well as the activation function.

The post-processor controller block 910 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 910 aggregates these signals, as mentioned, and outputs signals to the post-processing units 915 to indicate when the post-processing units are receiving valid dot product or ALU data.

The post-processor 900 includes numerous post-processing units 915 that handle the non-dot product computation of the neural network nodes. In some embodiments, the post-processor block within a segment includes the same number of post-processing units 915 as there are dot product bus lanes and activation write bus lanes (which is also the number of adder trees in each core for computing partial dot products). Each post-processing unit 915 receives two types of data inputs: (1) dot products from the dot product bus for convolution and fully-connected neural network nodes and (2) activation inputs (ALU inputs) from the core RAM for pooling nodes and element-wise operator nodes. In some embodiments, both types of inputs are used to execute a replicated layer (e.g., by first executing multiple convolutional layers and subsequently by combining the layers as an element-wise layer).

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 10-12.

The post-processing switch 920 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 10:
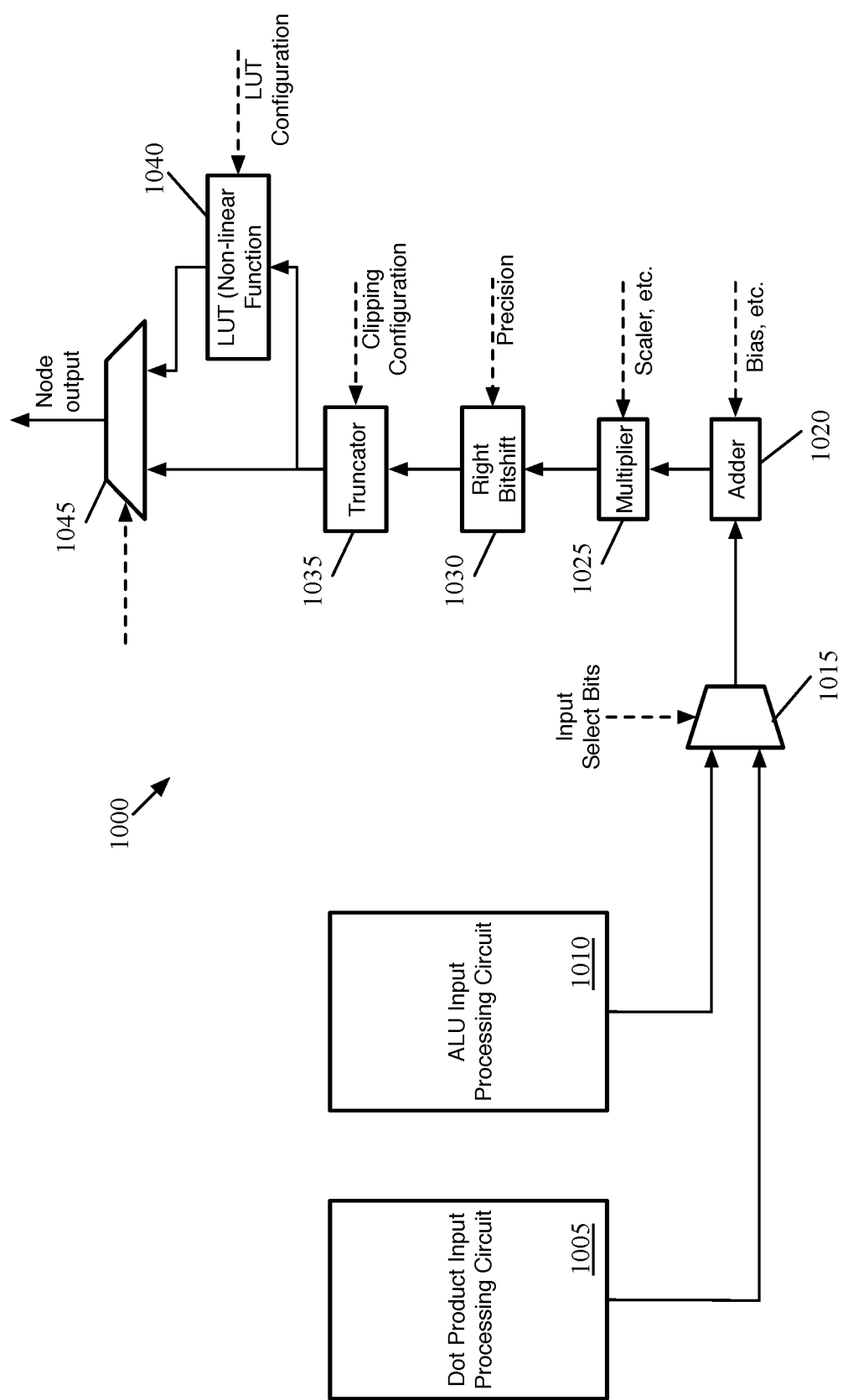
FIG. 10 conceptually illustrates the structure of a post-processing unit of some embodiments.
Figure 11:
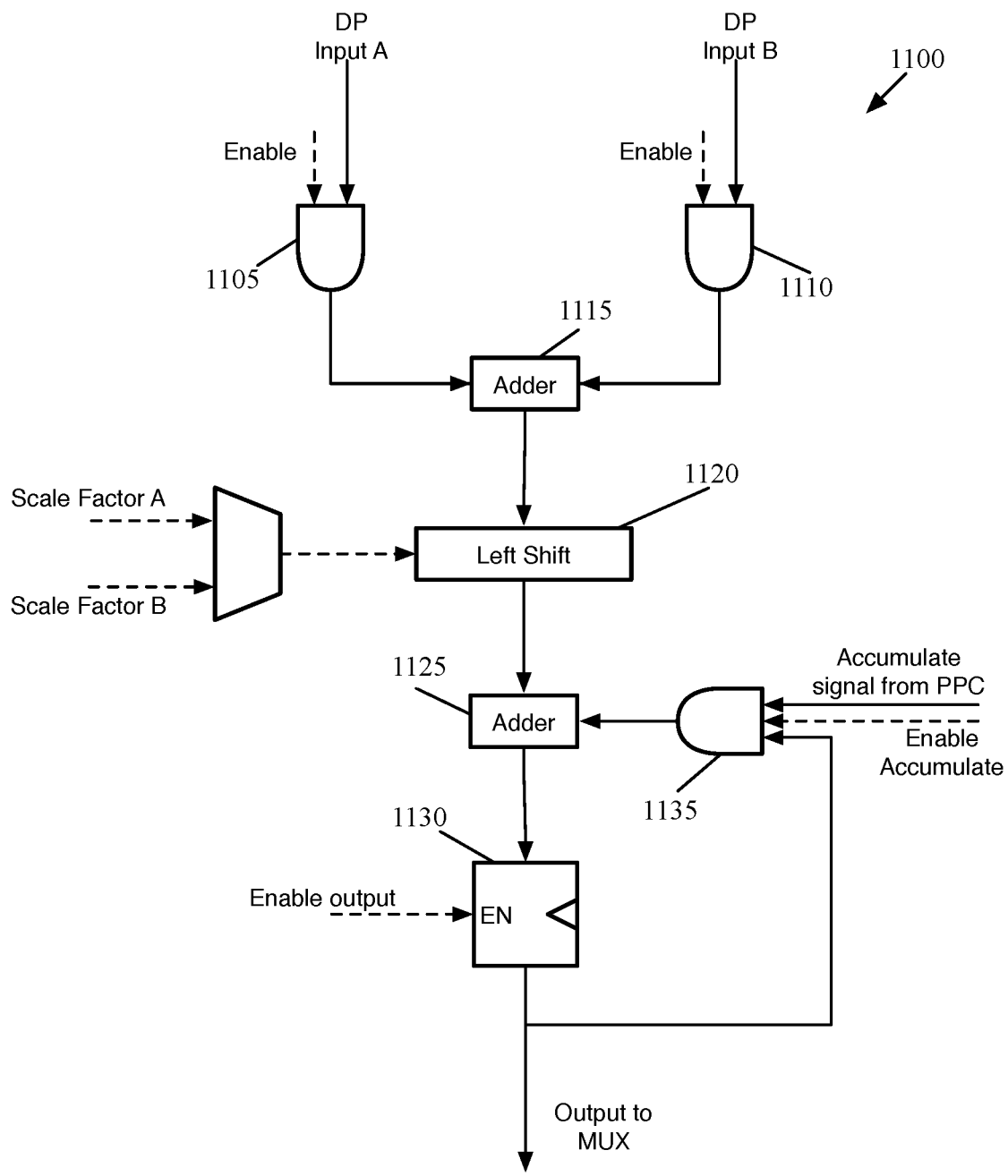
FIG. 11 conceptually illustrates a dot product input processing circuit of some embodiments.
Figure 12:
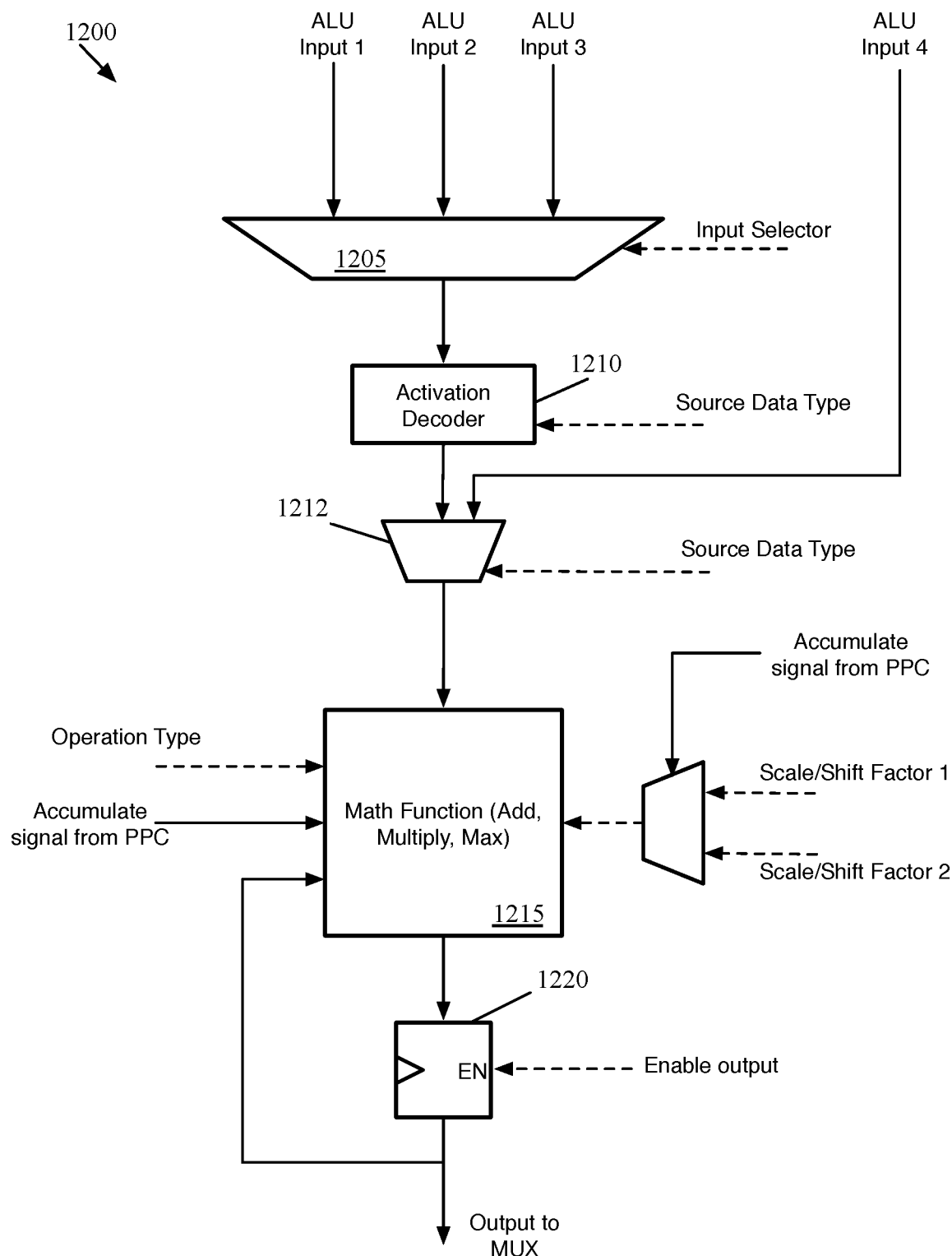
FIG. 12 conceptually illustrates an ALU input processing circuit of some embodiments.

As mentioned, FIGS. 10-12 illustrate the post-processing units in more detail. FIG. 10 conceptually illustrates the structure of a post-processing unit 1000 of some embodiments. As shown, the post-processing unit 1000 includes a dot product input processing circuit 1005, an ALU input processing circuit 1010, a multiplexer 1015 that selects between the outputs of these two circuits, and a set of post-processing operation circuits.

The dot product input processing circuit 1005, described in further detail by reference to FIG. 11, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bitshifting the first set of input data.

The ALU input processing circuit 1010, described in further detail by reference to FIG. 12, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., for the element-wise addition operation used to combine multiple replica layers). In some of these embodiments, the cores provide input values directly to the post-processing units without computing dot products, and the post-processing units are configured to perform the appropriate operations on these inputs.

The output of each of these circuits 1005 and 1010 is sent to a multiplexer 1015, and a set of configuration bits is used to select between these two possible inputs. This input value is sent to an adder 1020 and then to a multiplier 1025. For dot product outputs, the adder 1020 adds the bias of the linear function for the node and the multiplier 1025 multiplies this by the scaling factor for the linear function. The value sent to the multiplier 1025, in some embodiments, is a combination of (i) the scaler value computed during the training of the neural network (which is often 1) and (ii) the positive value of the ternary weight (which was removed in order to scale the weight values used in the dot product to 1 and −1). As described below, some embodiments use this scaling factor at the multiplier 1025 to handle complications arising from quantization of replica layers.

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and typical element-wise operator layers may use the same value for all of the nodes (often zero). However, the element-wise operation used to combine multiple replica layers may use individual node-specific bias values in some embodiments, as this layer applies post-processing operations as for a convolutional layer.

For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1030 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions. This bit shift circuit 1030 can be used to modify the precision of replica layers in some embodiments, as described below.

The truncator 1035 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1035 receives (as output from the right bit shifter 1030) more bits than it outputs (e.g., receiving 32 bits but outputting a maximum of 16 bits).

Finally, the LUT 1040 implements the non-linear activation function. The full (e.g., 16-bit, 8-bit) output of the truncator 1035 is passed to the multiplexer 1045, while a subset of the output bits (e.g., 5 bits) are also split off to the LUT 1045. This LUT effectively implements a mapping table representing the activation function for the neural network computation node, and the multiplexer 1045 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1035. In this case, the period of the period function is the full truth table provided to the lookup table 1040, with the modulus function meaning that only the 5 least significant bits of the output from the right bit shifter 1030 will affect the value output by the lookup table 1040.

FIG. 11, as mentioned, conceptually illustrates a dot product input processing circuit 1100 of some embodiments. As shown, the circuit 1100 receives the output of two dot product bus lanes (dot product input A and dot product input B). These inputs are each gated by AND gates 1105 and 1110, which use enable bits from the cluster controller to specify which dot product to use as input (or both), in certain cases. In some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane in some embodiments.

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1100 effectively acts as a pass-through for the first dot product input. The AND gate 1105 enables this first dot product input, while the AND gate 1110 gates the second dot product to 0. However, in other situations, the adder 1115, left-shift operator 1120, and adder 1125 enable the dot product calculation for a neural network node to be completed and provided to the other post-processing operations. In addition, the left shift circuit 1120 can also be used to align a dot product to ensure that the binary point is in the correct location for the input value.

In addition to these dot product operations, in some embodiments the post-processing units include additional circuitry for performing operations for neural network computation nodes that do not use dot products. The nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape (i.e., that have the same size and number of activation grids), and add or multiply the corresponding elements from those layers (e.g., to combine multiple replica convolutional layers).

FIG. 12, as mentioned, conceptually illustrates an ALU input processing circuit 1200 of some embodiments. As shown, the ALU input processing circuit 1200 receives a set of ALU inputs (in this case 4) from an ALU bus that carries activation values directly from the cores. The ALU inputs for each post-processing unit are selected from more than one core in some embodiments (e.g., the multiple cores of the cluster to which the post-processing units belong). A multiplexer 1205 selects one of these inputs (based on configuration data from the local cluster controller).

The selected input is sent to the activation decoder 1210, which sign-extends the input value (e.g., by adding an extra bit to this value). For instance, a 4-bit input activation would be sign-extended into a 5-bit value. A fourth ALU input is also provided in some embodiments, that carries an input activation of a different (e.g., larger) size. For example, if the first three ALU inputs carry 4-bit inputs (sign-extended to 5-bits each), the larger fourth ALU input of some embodiments carries an 8-bit input activation (e.g., stored in a portion of the core RAM that could hold two adjacent 4-bit activation values). A multiplexer 1212 selects either the sign-extended smaller input activation from the activation decoder 1210 or the larger input activation, depending on configuration data from the local cluster controller (e.g., based on the size of the current input activations).

The math circuit 1215 is a set of circuit blocks that performs operations on a pair of operands. In some embodiments, the first operand is the decoded ALU input from the activation decoder 1210 (or the larger fourth ALU input) and the second operand is either a preset value or the previous output of the math circuit 1215. Some embodiments also subject the first input to a reverse shift and scale, if needed, to put this input in the same number system as the second operand. The shift and scale values are determined by configuration data from the cluster controller, which also provides data to the math circuit 1215 to indicate which of a set of possible operations the math circuit 1215 performs in a given cycle.

In some embodiments, the math circuit 1215 can be configured to perform addition (e.g., for both element-wise addition and average pooling), multiplication (e.g., for element-wise multiplication) and comparison (for maximum pooling). In some embodiments, for average pooling and addition, an 18-bit adder is used. For maximum pooling, an 8-bit comparator is used. For multiplication, an 8-bit×8-bit multiplier is used, with the lowest two bits of precision of the result rounded off to keep the binary place in the same position. Other embodiments use different circuits to enable these computations.

Each of these mathematical operations requires multiple clock cycles in the circuit of some embodiments, as only a single input can be received each cycle. The register 1220 holds the previous output of the math circuit 1215 until that output is required as an operand for the next operation of the math circuit 1215, or the operation is complete and the value is sent to the other post-processing operations (as shown in FIG. 10).

Figure 13:
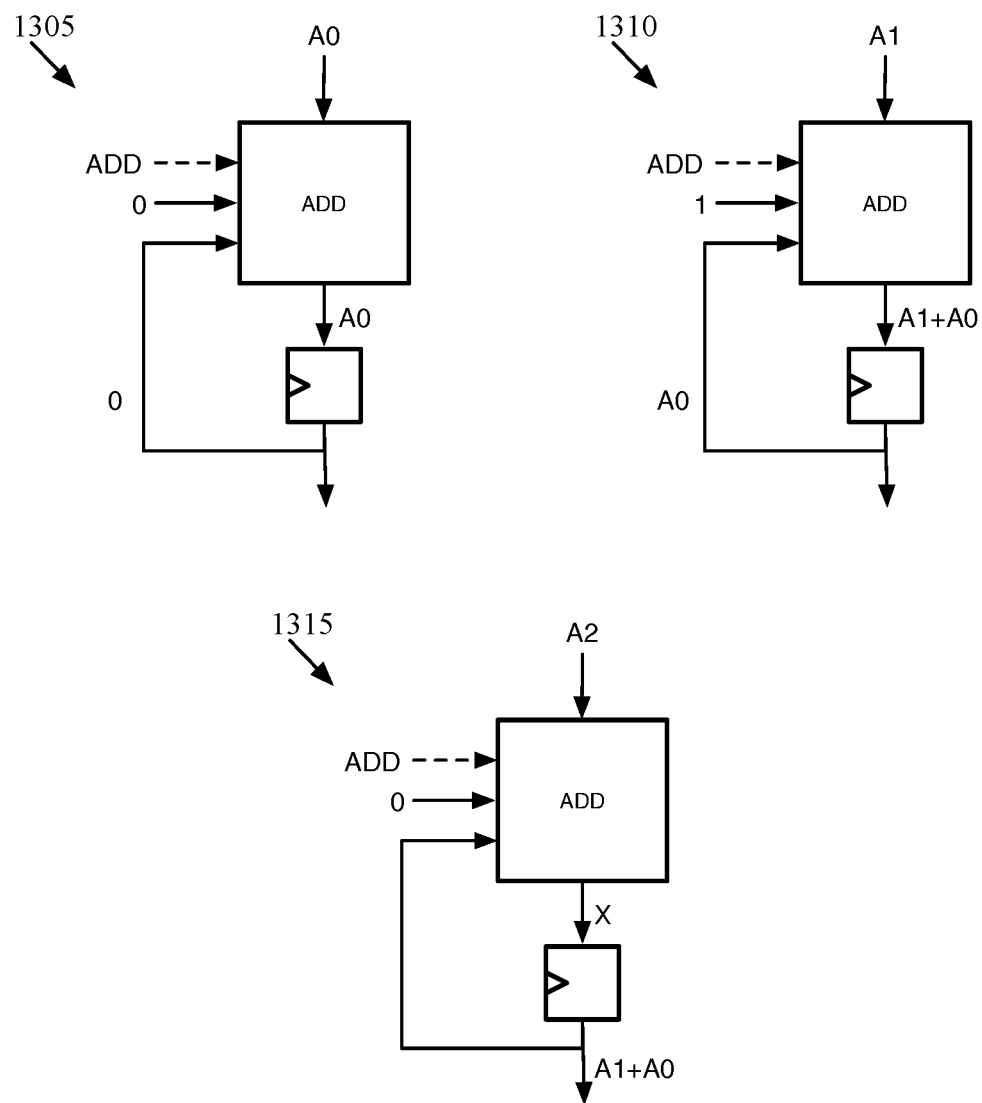
FIG. 13 conceptually illustrates an example of the math circuit performing element-wise addition.

FIG. 13 conceptually illustrates an example of the math circuit 1215 performing element-wise addition, which is used in some embodiments to combine the intermediate outputs of replicated layers. As discussed above, the math circuit takes as its first input operand the decoded ALU input, shifted and scaled as necessary, and as the second input operand either a preset value or the previous output of the math circuit. In some embodiments, the math circuit selects the second operand based on an accumulate signal from the controller. The circuit selects from the available math operations using an operation type input from the controller. In some embodiments, the operation type input is a 6-bit opcode that specifies whether the operation is a pooling, addition, or multiplication operation.

FIG. 13 specifically illustrates the math circuit performing an element-wise addition operation for activation inputs from two layers (e.g., an original layer and one replica layer). The two inputs (A0, A1) are received one at a time (e.g., in subsequent clock cycles) as primary input, and added using the adder sub-block of the math circuit block. In this example, the configuration data specifying the operation type specifies an addition operation.

In the first (initial) cycle 1305, the activation input A0 is received at the first operand input. The accumulate signal input is off, indicating that the secondary operand input should be a preset value (0, in this case defined as the preset based on the operation type because 0 is the additive identity). Accordingly, the math circuit 1215 receives input value A0 and outputs value A0 to the register. In the second cycle 1310, the circuit receives the next input A1 as the first operand. The accumulate signal input is on, so the second operand is read from the register 1220, currently storing the result of the previous output, A0. The math circuit therefore outputs value A1+A0 to the register.

Finally, in the third cycle 1315, the accumulate signal is off, so the math circuit either begins a new calculation (if the input data is available at this time) or does not perform an operation. The accumulated result of the previous calculation is not used as the second operand input. In this example, the first operand input to the math circuit is the next activation A2 for the next calculation, in this case a new addition operation. However, the math circuit 1215 could be configured to perform any different operation now that the accumulation is reset. The final output of the example calculation, namely A1+A0, is selected by the multiplexer 1015 and used for additional post-processing operations as described above with reference to FIG. 10 (e.g., in the case of a replicated layer, the application of bias and scale values for the combined layer). It should be understood that, if additional replica layers are used, then the output A1+A0 can be stored in the register and fed back into the math circuit 1215 to be combined with corresponding values from additional replica layers. The math circuit 1215 and its operations are further described in U.S. patent application Ser. No. 16/547,506, filed Aug. 21, 2019, now issued as U.S. Pat. No. 11,222,257, which is incorporated herein by reference.

Figure 14:
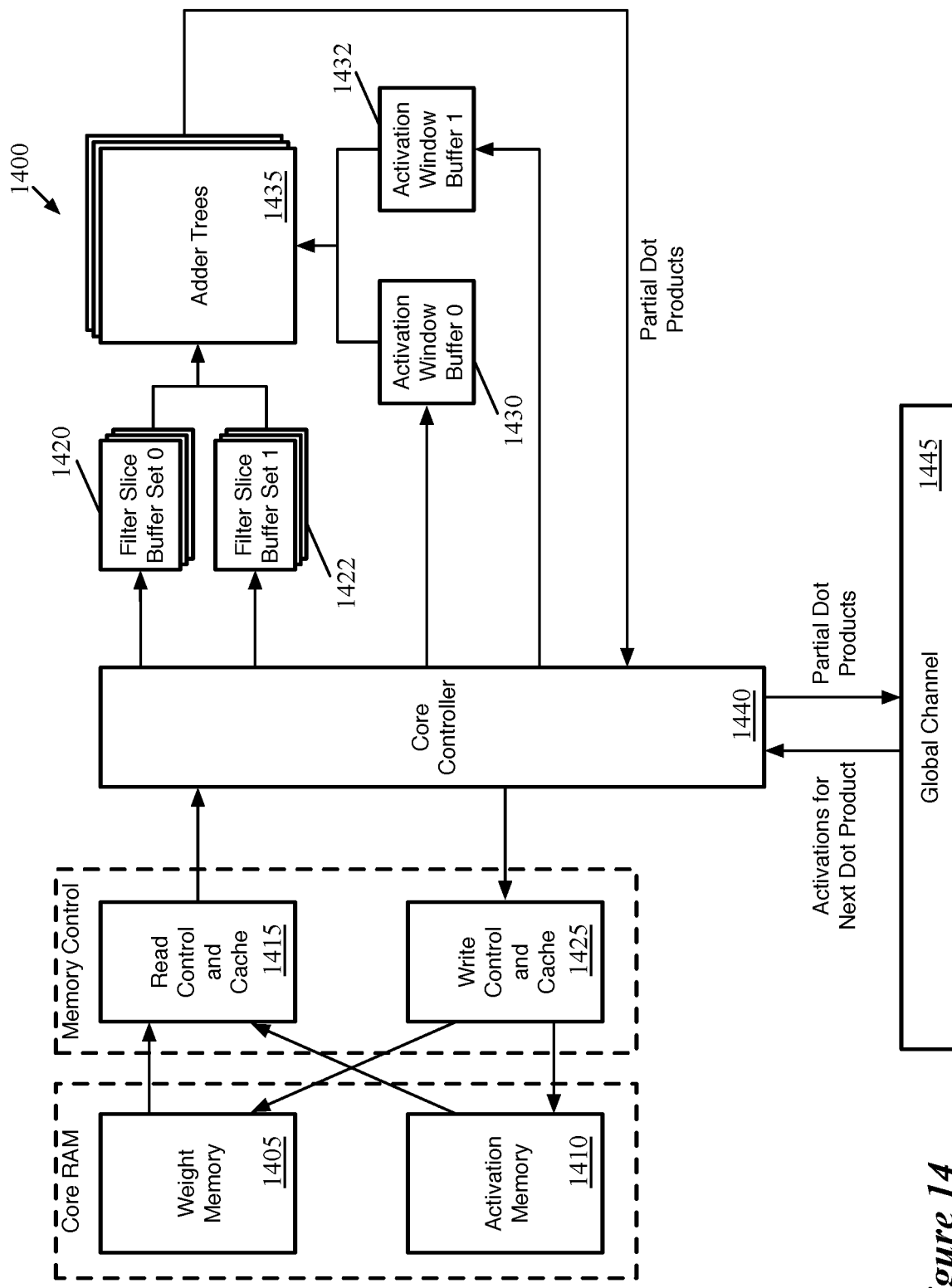
FIG. 14 conceptually illustrates the data flow within one of the cores of some embodiments for a dot product computation.

As mentioned, the dot product cores perform the majority of the dot product computation of the chip fabric of some embodiments. FIG. 14 conceptually illustrates the data flow 1400 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1405 and activation values in the activation memory 1410. In some embodiments, as shown, these memories 1405 and 1410 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 17-19.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1405 is typically larger than the activation memory 1410 (e.g., 512 KB to 64 KB), as the activation memory is at least party overwritten for each new layer of the neural network while the weight memory 1405 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1405 is allocated per weight value (e.g., by encoding the weight values in such a way that many of the zeros are removed, while storing additional data for each non-zero weight value).

The read controller and read cache 1415 reads data from the weight memory 1405 into sets of filter slice buffers 1420 and 1422 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1420 and secondary filter slice buffers 1422, as shown in this figure. In a given clock cycle, at most one of these sets of filter slice buffers is used to compute dot products (e.g., using multiplexers to select only one of the sets of weight value data). For simpler dot product computations, only the primary filter slice buffer 1420 is needed, so there is no need to load weight values into the secondary filter slice buffers 1422. However, in other cases, both sets of filter slice buffers may be used (e.g., when dot products are too large to be computed in a single clock cycle using only the primary buffers).

The read control and cache 1415 also reads data (input values) from the activation memory 1410 into the activation window buffers 1430 and 1432. In addition, the read controller 1415 arranges the input values within the activation window buffers 1430 and 1432 in some embodiments to match up with the weight values in the filters. In some embodiments, the input values in an activation window read into the buffers 1430 (and 1432) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1430 and a secondary activation window buffer 1432. In a given clock cycle, at most one of these sets of activation window buffers is used to compute dot products (e.g., using multiplexers to select only one of the sets of activation input values). For simpler dot product computations, only the primary activation window buffer 1420 is needed, so there is no need to load activation inputs into the secondary activation window buffer 1422. However, in other cases, both activation window buffers may be used (e.g., when dot products are too large to be computed in a single clock cycle using only the primary buffers). In some embodiments, as shown, the same read controller and cache 1415 is used to read data from both the weight memory partition 1405 and the activation memory partition 1410. In such embodiments, the cache is used to store weight value data when reading the weights from the weight memory 1405. For each pass, this memory control circuit first reads the encoded weight data and provides this data to the core controller 1440 (which decodes weight data and loads the decoded weight data into the filter slice buffers), then reads input values and provides these values to the core controller 1440 (for the core controller to load the input values into the activation window buffer(s) interspersed with the computation of dot products by the adder tree circuits 1445).

The adder trees 1445 compute the dot products between the weight values represented in the filter slice buffers 1420 and the input values in the activation window buffer 1430. The details of these partial dot product computation circuits of some embodiments are described below by reference to FIG. 15. These adder trees 1445 output partial dot products (e.g., 10-bit values) that are provided to the dot product bus, which combines the partial dot products with other partial dot products as described above. In some embodiments, the number of filter slice buffers in each of the sets 1420 and 1422 is equal to the number of adder trees 1435 in the core, as well as the number of dot product bus lanes, post-processing units, and activation write bus lanes in each segment. Thus, for a typical neural network computation node, the partial dot products computed by the adder trees 1435 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 1440 configures and coordinates the operation of the read and write controllers 1415 and 1425 in addition to the filter slice buffers 1420, activation window buffer 1430, and adder trees 1435. Furthermore, the core controller 1440 receives the input activations and weights from the read controller 1415, and loads them into the correct slots in the sets of filter slice buffers 1420 and 1422 and the activation window buffers 1430 and 1432 (or directs them to the ALU bus for non-dot product computations). Lastly, when the adder trees 1435 output their partial dot product values, the core controller 1440 sends these values to the dot product bus in the global channel 1445. When the activations for the next layer are output, the activation write bus carries these values to the core controller 1440, which provides them to the write control and cache 1425 to be written to activation memory 1410.

To reduce the circuit area and power required for dot product computations (which use the majority of resources for neural network inference), the partial dot product computation circuits (e.g., the adder trees 1435) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 15:
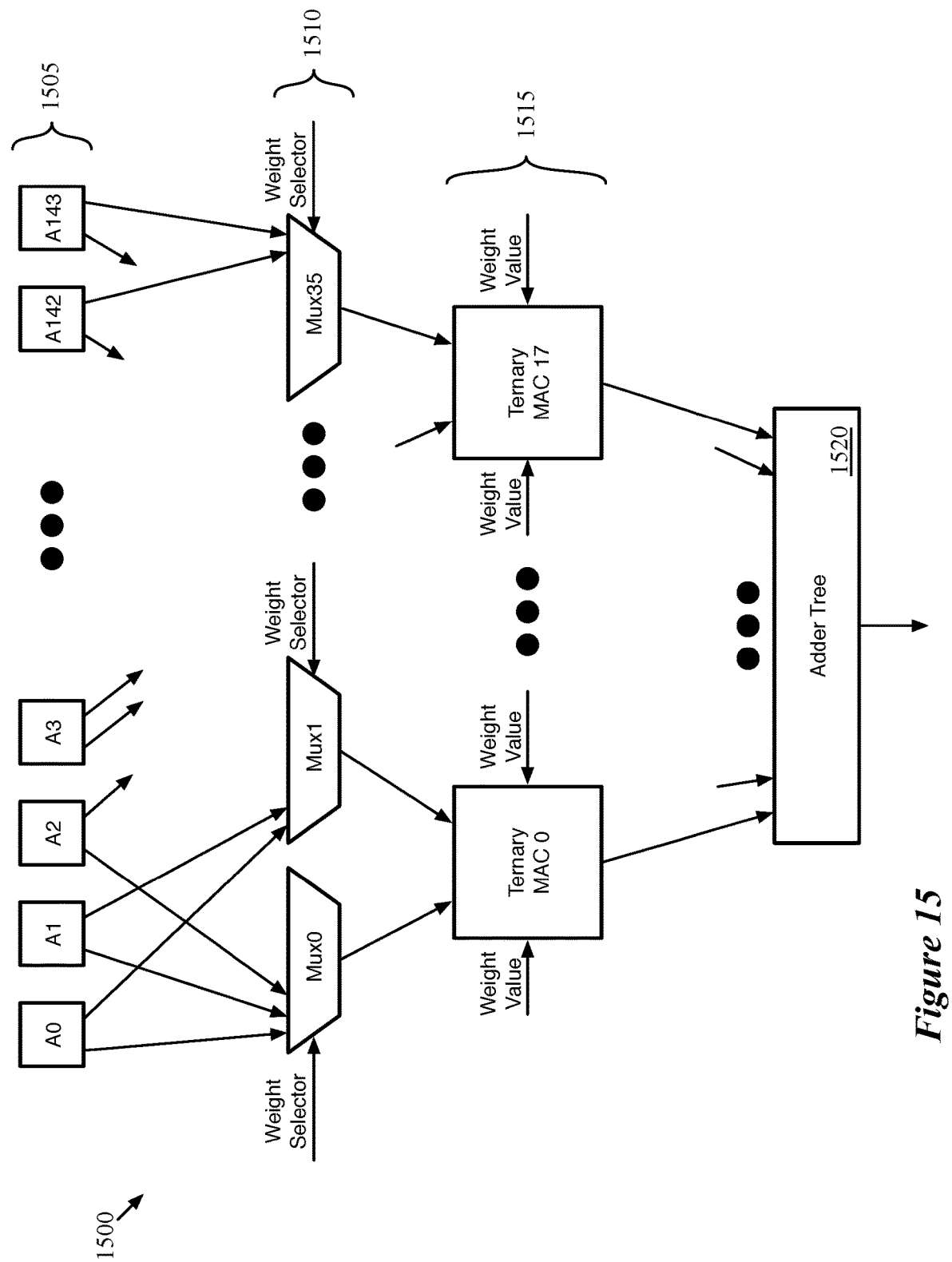
FIG. 15 conceptually illustrates an example of a partial dot product computation circuit for a guaranteed weight sparsity of at least 75%.

FIG. 15 conceptually illustrates an example of such a partial dot product computation circuit 1500 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1500 includes a set of activation inputs 1505, a set of multiplexers 1510, a set of ternary multiplier-accumulator (MAC) circuits 1515, and an adder tree 1520.

In this example, the dot product computation circuit 1500 includes 144 input values 1505. In different embodiments, the activation window buffer may have different sizes, which defines the size of the partial dot product computation. Each input value storage (e.g., each location in the activation window buffer) is connected to two of the thirty-six multiplexers 1510. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1510 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1510 allows for 288 sets of wires from the activation inputs 1505 to the multiplexers 1510, which is two wires for each activation input. If the sparsity guarantee was only 50%, then seventy-two 4-input multiplexers could be used with two sets of wires for each activation input 1505 (or seventy-two 8-input multiplexers with four sets of wires for each activation input 1505), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1510. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1505 to the multiplexers 1510. In some embodiments, this algorithm computes two hashes (e.g., with two different hash functions) for each of the activation input locations 1505 that map to two different multiplexers 1510 (e.g., by computing the hash modulo 36). Each activation input location 1505 is wired to these two different multiplexers 1510 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1510 are determined by which of the inputs to the multiplexer carries an input activation value with a nonzero corresponding weight value, and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1510 provide their output to a set of ternary multiply-accumulator (MAC) circuits 1515. The ternary MAC circuits effectively form the leaves of the dot product computation, and the number of such circuits is half the number of multiplexers 1510 (18 ternary MAC circuits 1515 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1515 add the two input values from the multiplexers 1510 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1520 that computes the output for the partial dot product computation. In some embodiments, this adder tree is a standard adder tree circuit that adds pairs of values over several layers. For example, the adder tree 1520 receives 18 inputs for 9 adders, which in turn provide outputs to 4 adders (with an additional output to be added in later), etc. In some embodiments, the inputs to the ternary MACs 1515 are 4-bit inputs (the length of the quantized activation values), and the ternary MACs 1515 output 6-bit values. The adder tree 1520 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1505 to a single partial dot product computation circuit, in some embodiments each of these input values 1505 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1505 are mapped to three of the multiplexers 1510, rather than two.

Figure 16:
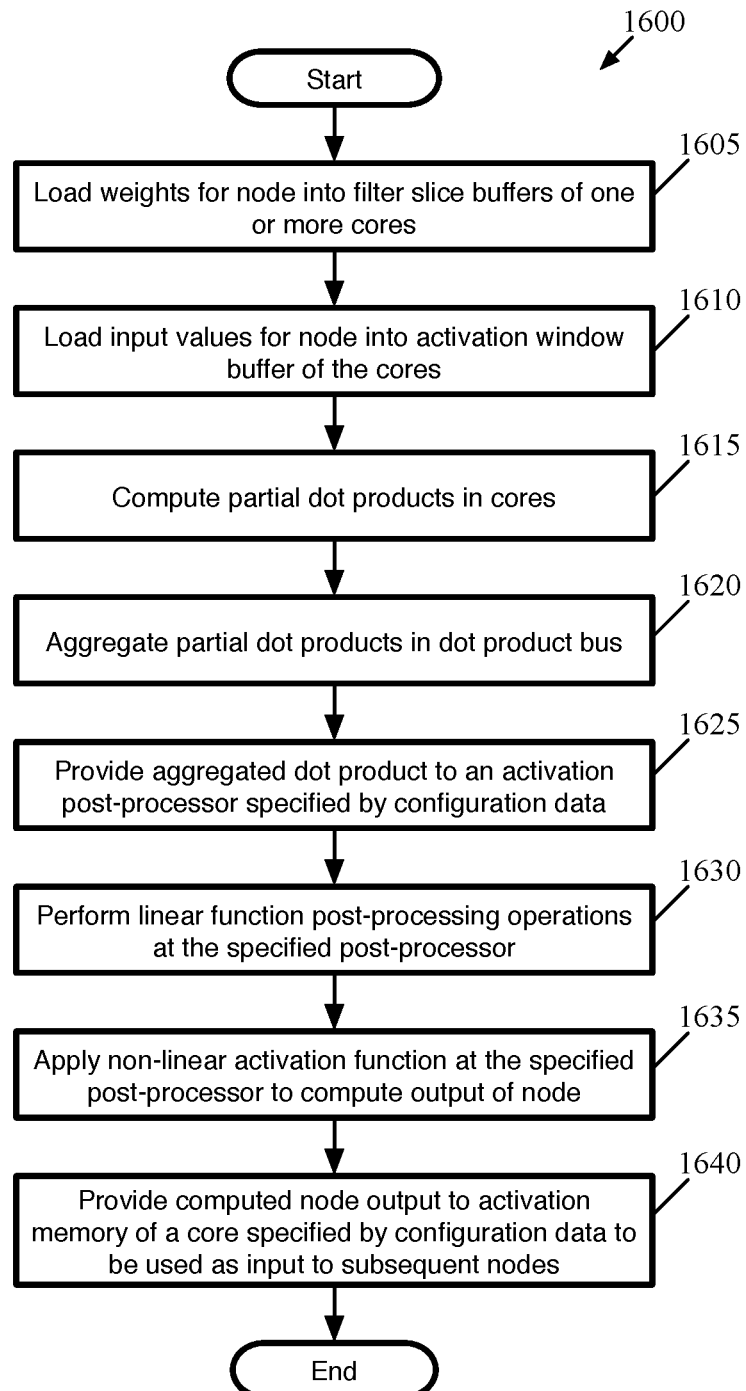
FIG. 16 conceptually illustrates a process of some embodiments for executing a set of instructions (or a portion of a set of instructions) to compute the output of a neural network node.

FIG. 16 conceptually illustrates a process 1600 of some embodiments for executing a set of instructions (or a portion of a set of instructions) to compute the output of a neural network node (specifically, a convolutional or fully-connected node). The process 1600 is executed by the chip fabric of a neural network IC, such as that described above. Typically, the process 1600 is executed simultaneously for multiple nodes, and operations 1610-1640 are performed repeatedly for multiple activation windows (i.e., multiple groups of input values loaded into the activation window buffer) in order to completely execute a layer (or portion of a layer) of the neural network. In the case of the process 1600, the dot product can be computed in a single cycle and does not involve any split filter slices (i.e., no time-multiplexing is required).

As shown, the process begins (at 1605) by loading the weights for a node into filter slice buffers of one or more cores. In addition, the process loads (at 1610) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1600 then computes (at 1615) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 15, and with ternary weight values of {0, 1, −1}, the multiplication is handled by the ternary MAC circuits shown in this figure.

Next, the process aggregates (at 1620) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1600 then provides (at 1625) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1600 performs (at 1630) linear function post-processing operations. For all dot products, this includes the bias and scale operations described by reference to FIG. 10 above, with the values for these operations sent as configuration data from the cluster controller. In addition, certain dot products are aggregated over multiple cycles by the dot product input processing circuit (e.g., if time-multiplexing is required to handle dot products with a large number of components, or for dot products with double the standard number of bits).

Next, the process 1600 applies (at 1635) the non-linear activation function at the post-processing unit to complete the calculation of the node output value. In some embodiments, as shown in FIG. 10, a lookup table is used for this computation (e.g., a 5-bit to 4-bit mapping table). The mapping for each possible set of input bits is provided by configuration data from the cluster controller in some embodiments.

In some embodiments, the operations 1615-1635 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 1615-1635 is executed in a single clock cycle.

Finally, the process 1600 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory.

As mentioned, the process 1600 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores =2304 total input values), (iii) all of the weight values are either 0, +α, or −α(and thus can be stored as 0, 1, and −1), and a large enough percentage of the weight values are 0 that the input values with non-zero weight values can each map to a different multiplexer input.

As mentioned above by reference to FIG. 14, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage.

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 17:
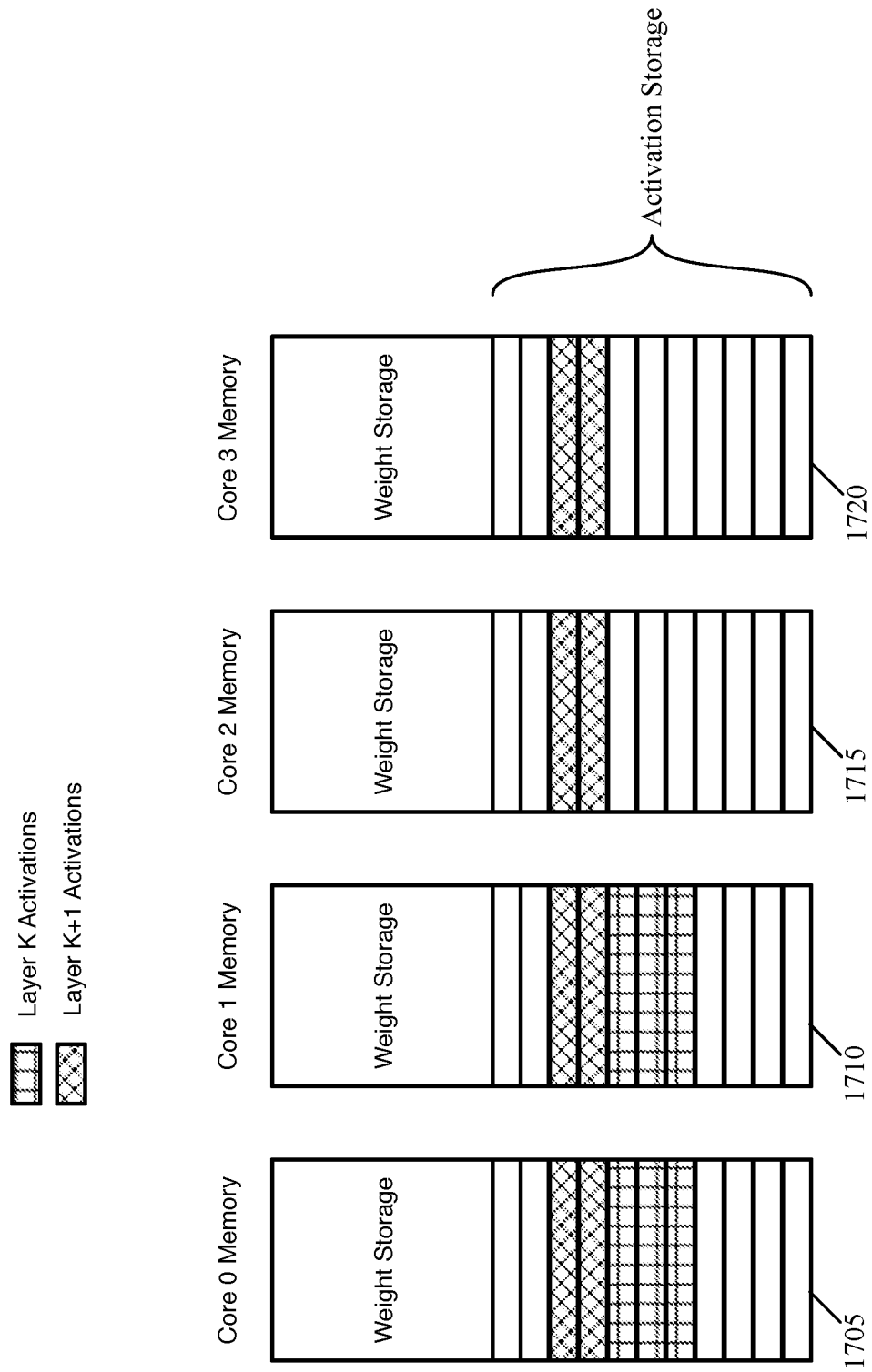
FIG. 17 conceptually illustrates the assignment of layers of activations to memories of four cores within a cluster.

FIG. 17 conceptually illustrates the assignment of layers of activations to memories 1705-1720 of four cores within a cluster. In this example, each of the cores is partitioned into weight storage (shown in the figure as a single block) as well as activation storage (shown as blocks of memory). Each of the blocks within the activation storage represents a set of memory locations (e.g., a bank of RAM, each containing numerous RAM words) in some embodiments. Though the figure shows a small number of such blocks within each core memory 1705-1720, it should be understood that a typical neural network computation circuit will have thousands of RAM words per memory. In addition, although the activation partition is larger than the weight partition in this example, the weight partition will often be the larger partition because all of the weight values for the entire network are stored in the memories at boot time.

The figure illustrates (using different types of cross-hatching) the memory portions allocated to the activation values (i.e., input activations) for each of two layers (layer K and layer K+1). In this example, the activations for layer K are divided across the memories 1705 and 1710 for two of the cores (meaning that only these two cores participate in the dot product calculations for this layer), whereas the activations for layer K+1 are divided across the memories 1705-1720 for all four illustrated cores. When there are replica layers, the input activations are the same for each replica layer, and the output activations for the replica layers will all be stored across the same set of cores (which may not be the same as the cores storing the input activations). For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 17, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 18:
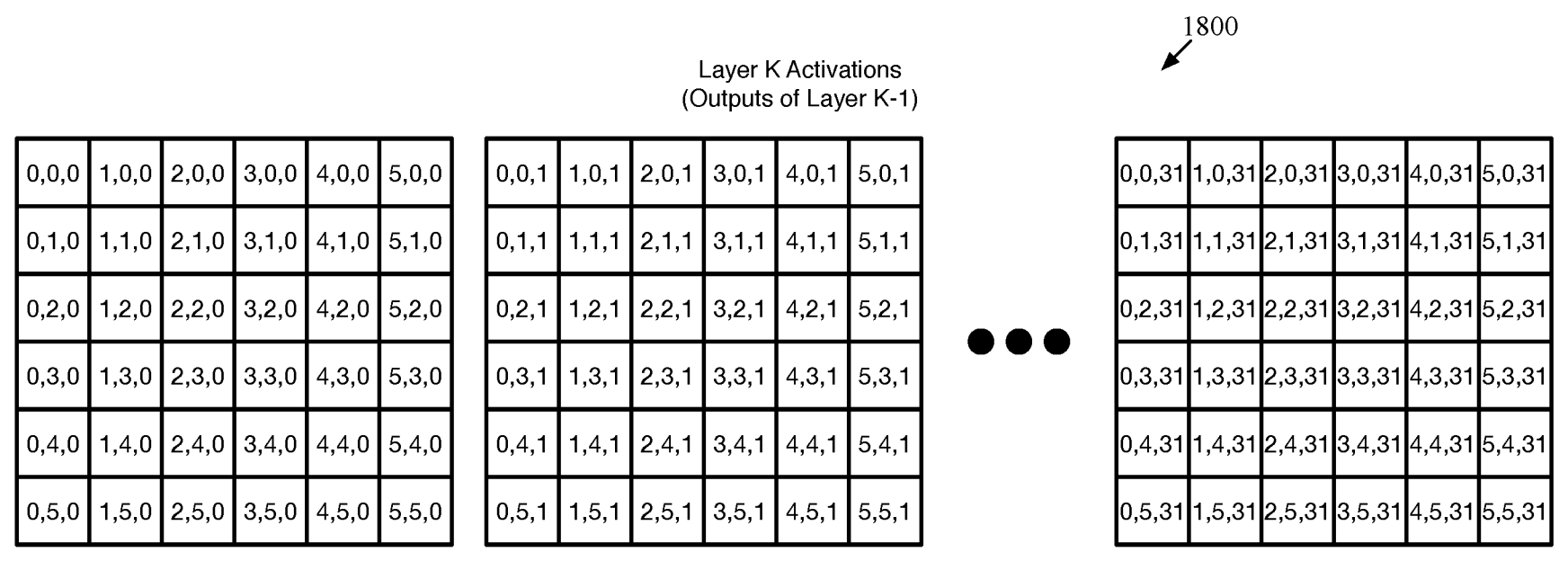
Figure 19:
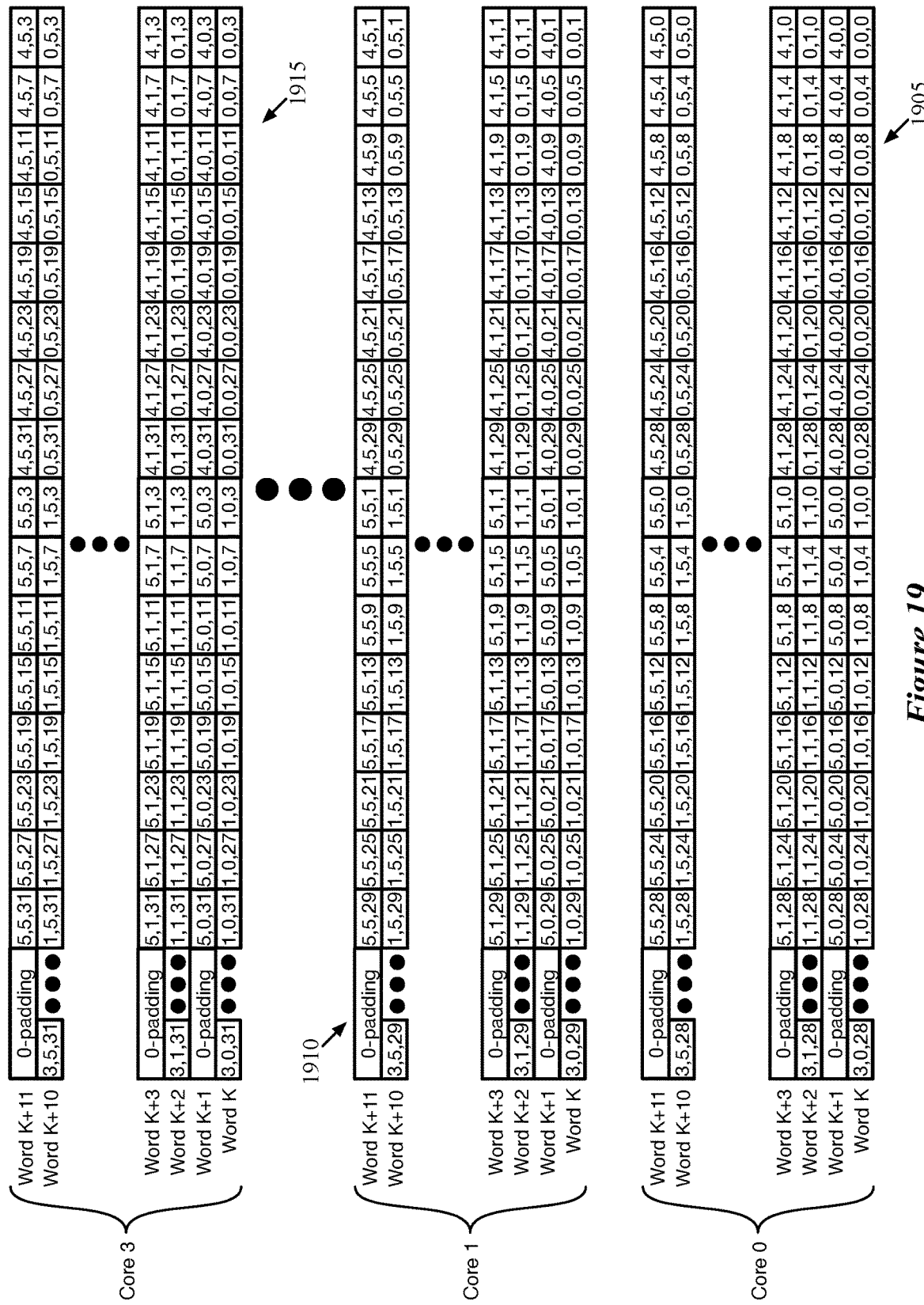
FIG. 19 conceptually illustrates the arrangement of the activation values of FIG. 18 among the memory of four cores.

FIG. 18 conceptually illustrates a layer of activation values 1800, and FIG. 19 conceptually illustrates the arrangement of these activation values 1800 among the memory of four cores. As shown in FIG. 18, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 19, as mentioned, illustrates the arrangement of the activation values 1800 according to the activation storage rules of some embodiments. In this case, the compiler determined that the activation values 1800 of Layer K will be stored in four cores of the neural network computation fabric (Cores 0-3). The memories 1905-1915 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 19). As mentioned, each two-dimensional grid of activation values is assigned entirely to a single core. In this example, grids {0, 4, 8, . . . 28} are assigned to Core 0, grids {1, 5, 9, . . . 29} are assigned to Core 1, grids {2, 6, 10, . . . 30} are assigned to Core 2, and grids {3, 7, 11, . . . 31} are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 1905-1915 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 1905-1915 is 0-padded (or padded with unverified data that is never loaded into the activation window buffer). This pattern (arranging the activation values in row-major order) is repeated for each row of activation values in the grids assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values. For a set of replica layers, the same input activations are used for each of the layers, and thus the weight values for each replica layer are stored in the same set of cores as the activations. If the replica layers have fewer non-zero weight values than the original layer, then the weights for these replica layers will occupy less memory in some embodiments.

As described above, the input activation values for a layer are read (e.g., by the read controller) and stored in a read cache. From this read cache, the activation values can be loaded into the activation window buffer, if being used for a convolutional (or fully-connected) layer, such as a replica layer. In addition, if being used for an element-wise or pooling layer (e.g., an element-wise addition layer used to combine the outputs of multiple replica layers), activations stored in RAM as shown in FIG. 19 may also be sent directly to the post-processing units via the ALU bus. The ALU bus maps activations to the PPUs for different types of operations in such a way as to take advantage of the manner in which the activations are stored in the core RAM.

FIGS. 20A-B illustrate a table 2000 showing the mapping of ALU outputs to the different post-processing units for a neural network computation circuit of some embodiments with 64 post-processing units (PPUs) per global channel segment. In this table, the first column is a PPU index, the second, third, and fourth columns are 4-bit ALU inputs by index, and the fifth column is an 8-bit ALU input (using adjacent indexes). For a given PPU, the inputs come from the ALUs of two or more of the four cores in the cluster corresponding to the global channel segment (e.g., alu0 is the ALU for core 0, alu1 is the ALU for core 1, etc.). The first two inputs (alu_a, alu_b) to each post-processing unit are output from the same index of two different cores (e.g., post-processing unit 27 receives the output from index 27 from cores 0 and 2). In some embodiments, this structure is repeated for each global channel segment with a set of PPUs and four cores that can store activation inputs.

In some embodiments, the different inputs are reserved for different types of math operations. In the example of FIG. 20, alu_a is selected for pooling operations (average or maximum) from cores 0 and 1, and alu_b is selected for pooling operations from cores 2 and 3. The third input alu_c is selected for element-wise operations (e.g. addition or multiplication). As discussed above, the fourth input alu_d is selected for any operations requiring 8-bit values. Based on the type of operation being performed, configuration data provided to the PPUs specifies which of these inputs to select.

As discussed above with reference to FIGS. 17, layers of activations are stored as RAM words in the activation memory of the cores. These words may have different lengths in different embodiments. For example, if the words are each 128 bits long and the activation values are each 4-bit values (as is the case in some embodiments), then a single word can hold 32 activation values. During a single clock cycle, the activation memory controller can output a single RAM word to the ALU bus. Accordingly, for 128-bit words and 4-bit activations, 32 activations can be read from each core simultaneously. When larger 8-bit activation values are used, then the corresponding block size is 16 activation values per core. For the subsequent discussion, 4-bit activations and 128-bit words are assumed for purposes of explanation.

In the example of FIG. 20, two inputs (alu_a and alu_b) are used for pooling operations, and each have indices that range from 0 to 32 from each of two cores. Therefore, for pooling operations a maximum block size of 32 activations per core can be output during a single clock cycle. The third input (alu_c) is used for element-wise operations, and has indices that range from 0 to 16 for each of all four cores in the cluster. Therefore, for element-wise operations a maximum block size of 16 activations per core are output during a single clock cycle, leaving 16 activations per core unused in some embodiments. The fourth input (alu_d) is used for 8-bit activations from all four cores, with a maximum block size of 16 (8-bit) activations per core. As noted above, for non-dot product computations the activations are directly sent to the ALU bus from the core controller, and do not need to be sent to the activation window buffers. In some embodiments, these activations are still read to and output from the read cache. The read cache output data is directed to the ALU bus rather than to the activation window buffer when the configuration data specifies for ALU operations to be performed.

For element-wise operations (e.g., multiplication or addition), activations from multiple different layers (e.g., multiple replica layers) are combined. In typical element-wise operations, activations from two layers of the neural network are added or multiplied, though some embodiments allow for more than two layers to be combined (e.g., for a replicated layer with multiple replicas) and/or for other operations to be performed. As a typical example, activation values that have the same (x,y,z) coordinate in two different layers are combined. In this case, the two layers will generally have the same dimension sizes in order for element-wise operations to be performed. To use the example illustrated in FIG. 18, the activation values at each (x,y,z) coordinate of layer K are combined with the values at the identical (x,y,z) coordinate of layer K+1 (Note: the indices K represent different entities in FIGS. 18 than they do in FIG. 19). According to the activation storage rules of some embodiments described above with reference to FIG. 19, each core used for storing activation values of a particular layer stores all of the activations in a subset of the grids of that particular layer. In addition, when two identically-sized layers are to be combined in an element-wise operation layer, the compiler of some embodiments ensures that the grids of the first layer are stored in the same cores as the corresponding grids of the second layer.

For example, suppose that the activations in grids 0-31 of layer K (shown in FIG. 18) are to be combined with the activations in corresponding grids 0-31 of replica layer K' using an element-wise operation, as described above by reference to FIG. 13. The activations of layer K are stored across four cores 0-3 as shown in FIG. 19, and the activations of layer K' would be stored across the same four cores 0-3, with the same eight grids of activations stored in each of the four cores.

The retrieval of these activations from core memory by the read controller and the provision of this data to the PPUs will now be discussed in detail for this illustrative example. As illustrated in FIG. 20, the input alu_c is reserved for element-wise operations, with PPUs 0-15 receiving activations from core 0, PPUs 16-31 receiving activations from core 1, PPUs 32-47 receiving activations from core 2, and PPUs 48-63 receiving activations from core 3. Thus, some embodiments use a fixed read block size of 16 for these element-wise operations. Because activations from the same layer do not need to be combined in any way (as they are for dot products or pooling operations), the actual block size of the activations in storage can be ignored in some embodiments. That is, the number of grids stored in each core is inconsequential to these operations, as 16 values from one layer are output from each core in a first cycle and the corresponding 16 values from the next layer are output from each core in the next clock cycle. In this case, the read controller can proceed sequentially through the RAM words in each core, rather than jumping back and forth.

Thus, in the example, the read controller in each core initially reads word K from the core memory, as well as the corresponding RAM word for layer K', and stores these two RAM words in the cache. In some embodiments, while the element-wise operations are being performed on these values, the next words of activations for each layer are also read into the cache. During the first cycle of computation, the read controllers in the various cores provide the first 16 activation values from RAM word K in core 0 $\{(0,0,0) \ldots (1,0,28)\}$ to PPUs 0-15, the first 16 activation values from RAM word K in core 1 $\{(0,0,1) \ldots (1,0,29)\}$ to PPUs 16-31, the first 16 activation values from RAM word K in core 2 $\{(0,0,2) \ldots (1,0,30)\}$ to PPUs 32-47, and the first 16 activation values from RAM word K in core 3 $\{(0,0,3) \ldots (1,0,31)\}$ to PPUs 48-63. Each of these PPUs stores this RAM word in its register 1220.

In the subsequent clock cycle, the read controllers in each core provide the corresponding activation values of layer K' from their respective cores to the PPUs. That is, the read controllers of the various cores provide the activation values $\{(0,0,0) \ldots (1,0,28)\}$ of layer K' from core 0 to PPUs 0-15, the activation values $\{(0,0,1) \ldots (1,0,29)\}$ of layer K' from core 1 to PPUs 16-31, the first activation values $\{(0,0,2) \ldots (1,0,30)\}$ of layer K' from core 2 to PPUs 32-47, and the activation values $\{(0,0,3) \ldots (1,0,31)\}$ from core 3 to PPUs 48-63. Depending on the configuration data received at the PPUs, each of these PPUs performs the appropriate element-wise operation to combine these values with the corresponding layer K values stored in their respective registers 1220, and provides these values to the additional post-processing operations shown in FIG. 10 (via the multiplexers 1015, configured to select from the ALU input datapaths 1200). In subsequent clock cycles, the next 16 values are output for layer K, which are combined with the corresponding 16 values for layer K', and so on.

Figure 21:
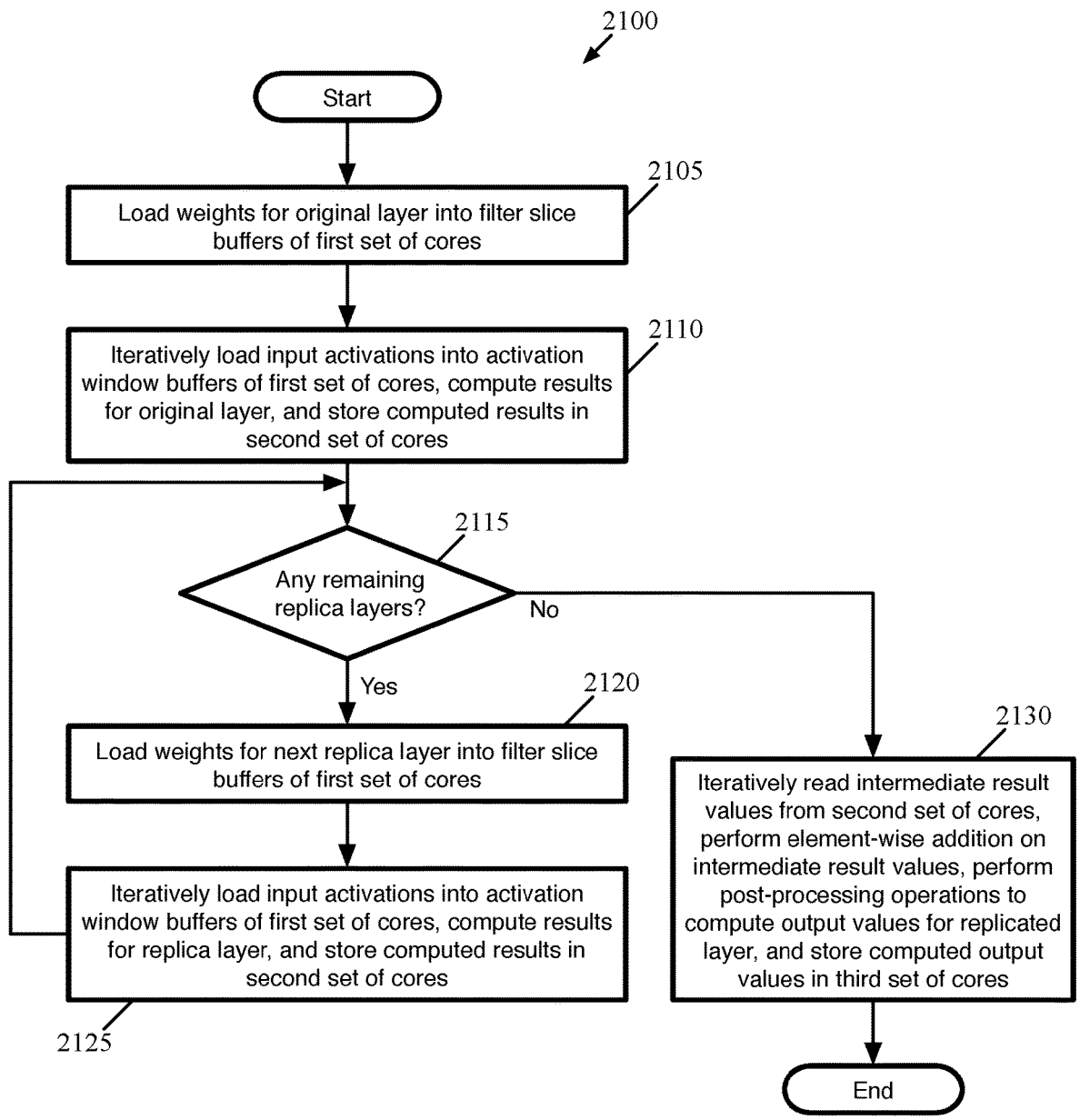
FIG. 21 conceptually illustrates a process of some embodiments for executing a replicated layer on a neural network inference circuit.

Now that the circuits for executing a set of replica layers on a neural network inference circuit of some embodiments have been described, the process for doing so on such a circuit will be elaborated upon. FIG. 21 conceptually illustrates a process 2100 of some embodiments for executing a replicated layer on a neural network inference circuit such as that described herein. The replicated layer of some embodiments includes an original layer (e.g., the with a first set of weights having a scale of $\alpha_k$) and a set of replica layers (with their own sets of weights having scales of $\alpha_k/3$, $\alpha_k/9$, etc.).

As shown, the process 2100 begins by loading (at 2105) the weights for the original layer into the filter slice buffers of a first set of cores. As mentioned, these weights are the set of weights having a scaling factor of $\alpha_k$, but are stored as ternary values $\{1, 0, -1\}$. The compiler determines the first set of cores that store these weights (as well as the replica weights) and perform all the dot product computations for the original and replica layers. It should be noted that, while the process 2100 describes the original layer being executed before the replica layers, this is not a requirement. Different embodiments execute the replica layers first and the original layer last, execute the various component layers in a random order, etc.

Next, the process 2100 iteratively (at 2110) loads the input activations for the replicated layer into the activation window buffers of the first set of cores, computes the results for the original layer (using these input activations and the weights loaded into the filter slice buffers), and stores the computed results in a second set of cores. As described above, the read controllers in the first set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling and bias factors for the layer are accounted for after the various replica layer outputs are combined. Some such embodiments nevertheless use the adder and multiplier circuits at this point to (i) account for the use of one's complement addition with negative weight values, as described in U.S. patent application Ser. No. 16/457,757, filed Jun. 28, 2019, now issued as U.S. Pat. No. 11,210,586, incorporated by reference above, as well as (ii) to account for any quantization-related scaling. The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed, and the next set of results for the original layer are stored in the second set of cores. This set of operations is repeated until the original layer is complete.

The process 2100 then determines (at 2115) whether any additional replica layers remain to be computed. If, for example, the layer is a standard convolutional layer with no replica layers, then the process does not need to perform any of the subsequent operations (i.e., there is no need to compute results for any replica layers, nor is there a need to add the original layer together with any other layers. On the other hand, if there is one or more replica layer, then some embodiments compute the results for the replica layers until, after the last replica, the corresponding result values from the original and all of the replicas are all added together.

It should be understood that FIG. 21 illustrates a conceptual process, and that neither the neural network inference circuit nor the system controller providing instructions to the circuit actually makes such a determination 2115 in some embodiments. Rather, the compiler defines the layers, source cores, and destination cores, and defines instructions for the chip to execute in order to perform the process 2100 (as part of the overall process of executing the neural network). In addition, the process 2100 is shown for the specific case in which there is at least one replica layer; if there is only a standard (non-replicated) convolutional layer, then this layer would be executed and there would be no need to combine those output values with any other replica layer output values.

Returning to the process 2100, if additional replica layers remain, the process loads (at 2120) the weights for the next replica layer into the filter slice buffers of the first set of cores. As mentioned, these weights are the set of weights having a scaling factor of $\alpha_k/3^x$ (where x indicates the number of the replica), but are stored as ternary values $\{1, 0, -1\}$. The compiler determines the first set of cores that store these weights (as well as the weights for the original layer and all of the other replica layers) and perform all the dot product computations for this current replica layer (and the original layer and other replica layers).

Next, the process 2100 iteratively (at 2125) loads the input activations for the replicated layer into the activation window buffers of the first set of cores, computes the results for the current replica layer (using these input activations and the weights loaded into the filter slice buffers at 2120), and stores the computed results in a second set of cores. As described above, the read controllers in the first set of cores load a set of the input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling and bias factors for the layer are accounted for after the various replica layer outputs are combined. Some such embodiments nevertheless use the adder and multiplier circuits at this point to (i) account for the use of one's complement addition with negative weight values, as described in U.S. patent application Ser. No. 16/457,757, filed Jun. 28, 2019, incorporated by reference above, as well as (ii) to account for any quantization-related scaling. The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed, and the next set of results for the current replica layer are stored in the second set of cores. This set of operations is repeated until the current replica layer is complete.

In some embodiments, the cores load the input activations in the same order for the original layer and each replica layer. This results in the storage of the result values for each of these layers in the same order in the memories of the second set of cores. That is, if a first result value computed from an original-layer filter and particular set of input values is stored in a particular core and particular relative memory location within its respective set of result values, then a second result value computed from the corresponding replica-layer filter and the same particular set of input values is stored in the same particular core and the same particular relative memory location within its own respective set of result values (i.e., the same RAM word relative to the starting point for that layer of result values and same offset within that RAM word).

Once all of the replica layers have been executed, the process 2100 iteratively (at 2130) reads the intermediate result values from the second set of cores, performs element-wise addition on the intermediate result values, performs post-processing operations to compute output values for the replicated layer, and stores computed output values in a third set of cores. As with the convolutional replica layers, this operation involves numerous repeated sub-operations. In some embodiments, as described above, a fixed number (e.g., 16 from each core) of the intermediate result values are output to the post-processing units at a time. In a first clock cycle, this number of result values from the original layer are output to the post-processing units from each core in the second set of cores, then the corresponding result values from a replica layer, and so on for each replica layer in order to combine the corresponding sets of intermediate result values. Once all of the current sets of values are combined, the post-processing units apply the bias, scale, and activation functions to the values in order to compute the output values for the combined layer. These values are, as mentioned, transported to and stored in the third set of cores, which may be the same as or different from both the first and second sets of cores, depending on the compiler decisions. The process 2100 then ends.

It should be noted that process 2100 indicates only one of several different ways to execute a replicated layer. For instance, other embodiments might execute two of the convolutional layers (e.g., the original layer and a first replica), add the intermediate result values from these layers together, execute the next convolutional layer and add this layer to the previous two, and so on for each layer. Still other embodiments might execute all of the convolutional layers, then perform successive separate element-wise operations (e.g., adding two replicas together in a first element-wise layer, then adding this total to the original in a subsequent element-wise layer). These options allow for execution on a neural network inference circuit that is limited to only adding together two values in a single element-wise operation. In addition, while all of the convolutional layers are performed by the same first set of cores, and the first two result values that are added together are stored in the same second set of cores, these next result values (i.e., original layer plus first replica layer) could be stored in a different third set of cores along with the intermediate convolutional results of the second replica layer. That is, each pair of result value sets that is to be added together in an element-wise operation need to be stored in the same set of cores, but not all of the replica layer result value sets need to be stored in this one set of cores.

When executing layers on the neural network inference circuit described above, the circuit quantizes the output value after each replica layer and/or element-wise addition operation. For instance, if a particular network uses 4-bit inputs and outputs, then each individual replica layer result value is quantized to four bits. Similarly, if each element-wise addition operation is limited to two layers, then quantization to four bits is performed after each such element-wise operation.

One result of this intermediate result quantization is that replica layers with smaller weight scales (i.e., the $\alpha_k/3$ and/or $\alpha_k/9$ replicas) suffer a larger fractional error due to quantization. In order to minimize this loss of precision, some embodiments apply a scaling factor in the post-processing units to these intermediate results. For instance, some embodiments apply a scaling factor of e.g., 2, or 4 (or ¼ or ½), that effectively acts as a bit-shifting operation (e.g., to change the binary point in the output value), so long as this scaling factor is cancelled by a subsequent operation. In some embodiments, when the outputs of the replicas are summed, the math circuit that performs the element-wise operations performs any necessary un-scaling (e.g., by again bit-shifting to move the binary point) before computing the sum. In addition, if any scaling factors remain after summation of the intermediate values, this can be factored into the scaling factor in the post-processing unit or using the right bitshift circuit that is applied prior to quantization and the activation function.

An example implementation of a replicated layer that includes the original layer (scaling factor of $\alpha_k$) as well as two replica layers (scaling factors of $\alpha_k/3$ and $\alpha_k/9$, respectively) will now be described. First, the circuit executes a first convolutional layer using the input activation values, with a scaling factor of $\alpha_k$ and the original layer ternary weight values, to compute a first set of intermediate results. For this layer and the subsequent two convolutional layers, no batch normalization or activation function is applied, in some embodiments. In addition, these first set of intermediate result values are output with 2.2 precision (i.e., two bits before and two bits after the binary point).

Next, the circuit executes a second convolutional layer using the same input activation values, with a scaling factor of $\alpha_k/3$ and the first replica layer ternary weight values, to compute a second set of intermediate results. In this case, the intermediate result values are output with 1.3 precision (i.e., one bit before and three bits after the binary point), which is equivalent to scaling by a factor of 2 before quantization. Because this factor of two is applied to values that are scaled by $\alpha_k/3$, there is no worry of overflow due to this scaling factor (in fact, there is less overflow possibility than for the original layer).

The circuit then executes a third convolutional layer again using the same input activation values, with a scaling factor of $\alpha_k/9$ and the second replica layer ternary weight values, to compute a third set of intermediate results. These intermediate result values are also output with 1.3 precision, which allows for the circuit to maintain one extra bit of precision for these two sets of intermediate values. In this case, with only two replica layers in addition to the original layer, there is no need to multiply by 4 or 8. However, if there is a third replica with a scale factor of $\alpha_k/27$, some embodiments scale these two layers by a larger factor (with the replica layer scaling factor of $\alpha_k/9$ and $\alpha_k/27$, there is not a worry of overflow).

With the three convolutional layers executed, the circuit executes an element-wise addition layer that adds the latter two sets of intermediate results (i.e., the results for the two replica layers) to compute partial sums. Some embodiments leave these partial sums with 1.3 precision (noting that the partial sums are again quantized to four bits).

Lastly, the circuit executes another element-wise addition layer between the first set of intermediate result values (from the original convolutional layer) and the partial sums from the first element-wise addition. To account for the difference in precision, some embodiments scale the original layer intermediate results by a factor of two before computing the sums (the internal computations in the post-processing circuits allow more than 4 bits, so data is not lost via this scaling). In some embodiments, the ALU input processing circuit can scale its inputs by a factor of 2 or 4, which is used to scale these inputs. The partial sum is scaled by ½, e.g. using the multiplier or the bit-shift circuit in the post-processing datapath shown in FIG. 10. At this point, any activation function (e.g., a ReLU, etc.) and/or batch normalization is applied, and the output values for the replicated layer are again quantized to 4 bits.

Such a neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT devices), etc.

Figure 22:
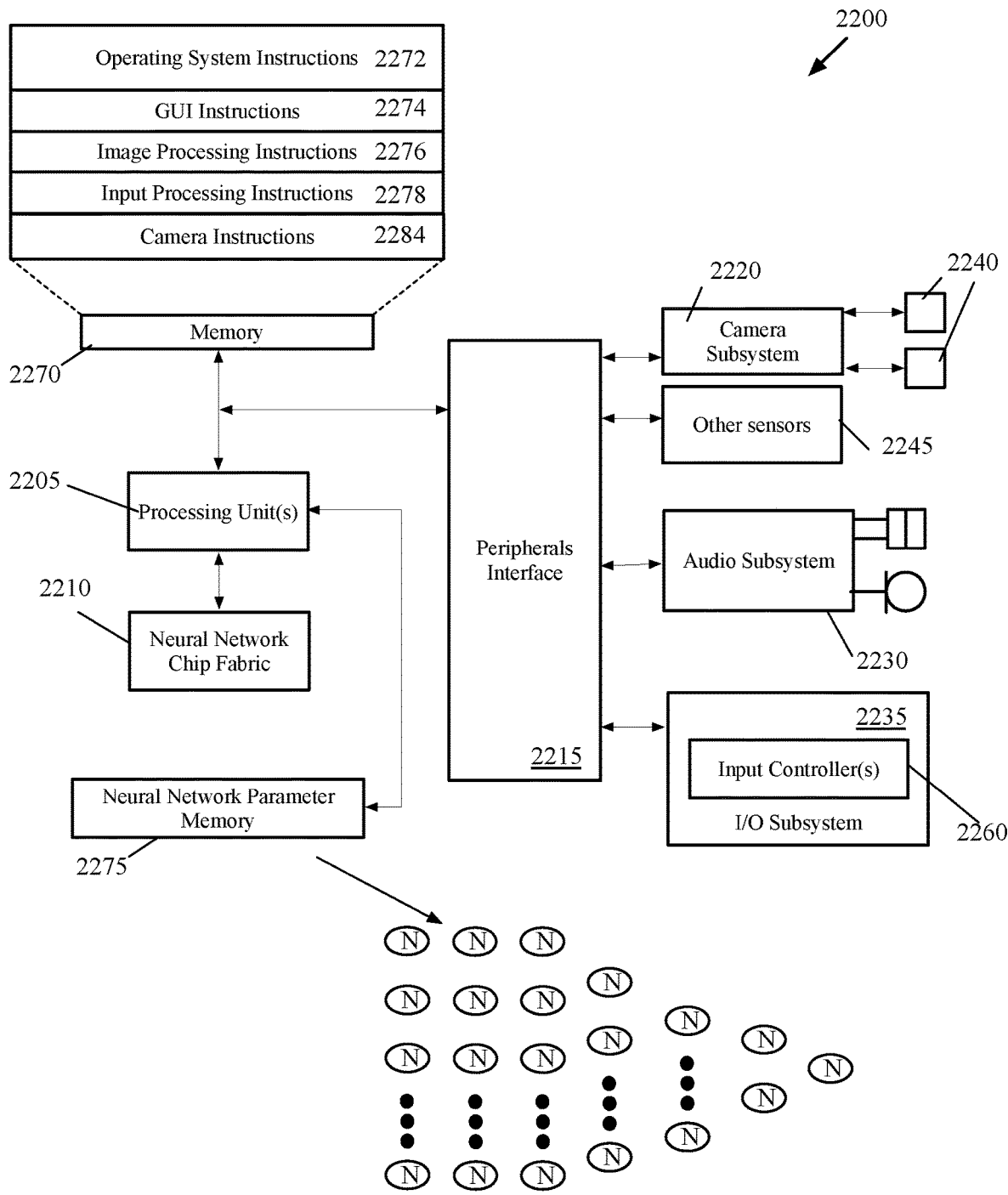
FIG. 22 illustrates an example of the architecture of a mobile computing device that stores neural network processing instructions.

FIG. 22 is an example of an architecture 2200 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 2200 includes one or more general-purpose processing units 2205, a neural network chip fabric 2210, and a peripherals interface 2215.

The peripherals interface 2215 is coupled to various sensors and subsystems, including a camera subsystem 2220, an audio subsystem 2230, an I/O subsystem 2235, and other sensors 2245 (e.g., motion/acceleration sensors), etc. The peripherals interface 2215 enables communication between the processing units 2205 and various peripherals. For example, an orientation sensor (e.g., a gyroscope) and an acceleration sensor (e.g., an accelerometer) can be coupled to the peripherals interface 2215 to facilitate orientation and acceleration functions. The camera subsystem 2220 is coupled to one or more optical sensors 2240 (e.g., charged coupled device (CCD) optical sensors, complementary metal-oxide-semiconductor (CMOS) optical sensors, etc.). The camera subsystem 2220 and the optical sensors 2240 facilitate camera functions, such as image and/or video data capturing.

The audio subsystem 2230 couples with a speaker to output audio (e.g., to output voice navigation instructions). Additionally, the audio subsystem 2230 is coupled to a microphone to facilitate voice-enabled functions, such as voice recognition, digital recording, etc. The I/O subsystem 2235 involves the transfer between input/output peripheral devices, such as a display, a touch screen, etc., and the data bus of the processing units 2205 through the peripherals interface 2215. The I/O subsystem 2235 various input controllers 2260 to facilitate the transfer between input/output peripheral devices and the data bus of the processing units 2205. These input controllers 2260 couple to various input/control devices, such as one or more buttons, a touch-screen, etc.

In some embodiments, the device includes a wireless communication subsystem (not shown in FIG. 22) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 22, a memory 2270 (or set of various physical storages) stores an operating system (OS) 2272. The OS 2272 includes instructions for handling basic system services and for performing hardware dependent tasks. The memory 2270 also stores various sets of instructions, including (1) graphical user interface instructions 2274 to facilitate graphic user interface processing; (2) image processing instructions 2276 to facilitate image-related processing and functions; (3) input processing instructions 2278 to facilitate input-related (e.g., touch input) processes and functions; and (4) camera instructions 2284 to facilitate camera-related processes and functions. The processing units 2210 execute the instructions stored in the memory 2270 in some embodiments.

The memory 2270 may represent multiple different storages available on the device 2200. In some embodiments, the memory 2270 includes volatile memory (e.g., high-speed random access memory), non-volatile memory (e.g., flash memory), a combination of volatile and non-volatile memory, and/or any other type of memory.

The instructions described above are merely exemplary and the memory 2270 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2275 stores the weight values, bias parameters, etc. for implementing one or more machine-trained networks by the neural network chip fabric 2210. In some embodiments, different clusters of the fabric 2210 can implement different machine-trained networks in parallel in some embodiments. In different embodiments, these neural network parameters are stored on-chip (i.e., in memory that is part of the neural network chip fabric 2210) or loaded onto the IC 2210 from the neural network parameter memory 2275 via the processing unit(s) 2205.

While the components illustrated in FIG. 22 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2205 and the neural network IC 2210, which enables the processing units 2205 to provide inputs to the neural network IC 2210 and receive the outputs of the network from the IC 2210. Also, while many of the functions have been described as being performed by one component, one of ordinary skill in the art will realize that the functions described with respect to FIG. 22 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
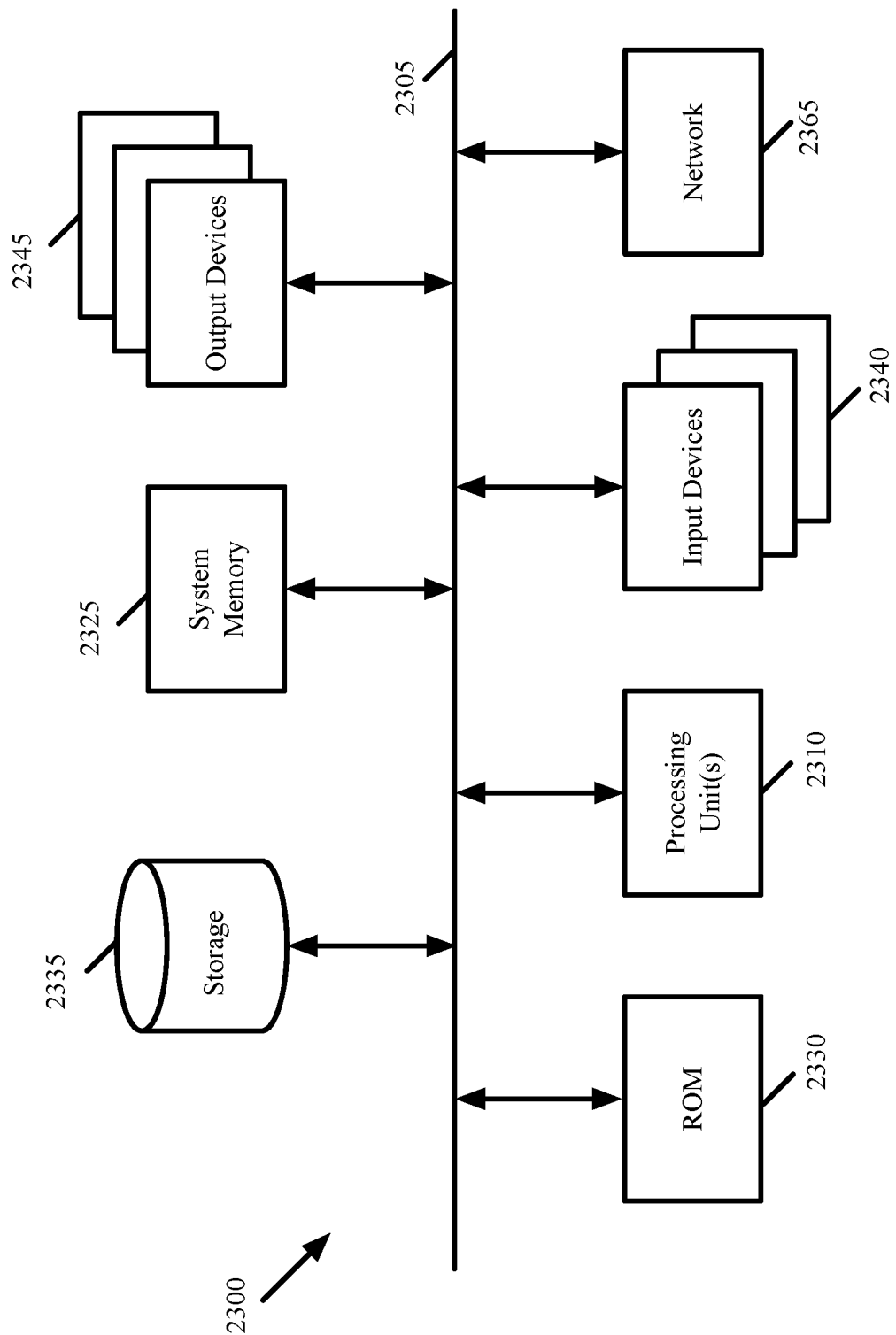
FIG. 23 conceptually illustrates an electronic system with which some embodiments of the invention are implemented.

FIG. 23 conceptually illustrates an electronic system 2300 with which some embodiments of the invention are implemented. The electronic system 2300 can be used to execute any of the applications (e.g., the training application) described above. The electronic system 2300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various memory units, the processing unit(s) 2310 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device. Like the permanent storage device 2335, the system memory 2325 is a read-and-write memory device. However, unlike storage device 2335, the system memory is a volatile read-and-write memory, such a random-access memory. The system memory stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieves instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 4, 16, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a plurality of parameters of a machine-trained (MT) network, the method comprising:

receiving an MT network comprising a plurality of layers of computation nodes, wherein each computation node computes an output value based on a set of input values and a set of trained weight values, wherein each layer has a set of allowed weight values;

for a first layer of the MT network with a first set of allowed weight values comprising a positive value, zero, and a negation of the positive value, defining a second layer with computation nodes corresponding to each of the computation nodes of the first layer, each second-layer computation node receiving the same input values as the corresponding first-layer computation node, wherein the second layer has a second set of allowed weight values comprising one-third the positive value, zero, and a negation of one-third the positive value, wherein the output values of the computation nodes of the first layer are added with the output values of the corresponding computation nodes of the second layer to compute output values that are passed to a subsequent layer of the MT network; and training the weight values of the MT network.

2. A method for training a plurality of parameters of a machine-trained (MT) network, the method comprising:

receiving an MT network comprising a plurality of layers of computation nodes, wherein each computation node computes an output value based on a set of input values and a set of trained weight values, wherein each layer has a set of allowed weight values;

for a first layer of the MT network with a first set of allowed weight values, defining a second layer with computation nodes corresponding to each of the computation nodes of the first layer, each second-layer computation node receiving the same input values as the corresponding first-layer computation node, wherein the second layer has a second, different set of allowed weight values, wherein the output values of the computation nodes of the first layer are added with the output values of the corresponding computation nodes of the second layer to compute output values that are passed to a subsequent layer of the MT network; and training the weight values of the MT network by using a loss function with (i) a term that biases the weight values of the first layer towards the values of the first set of allowed values and (ii) a term that ensures that a particular percentage of the weight values of the MT network have a value of zero.

3. A method for training a plurality of parameters of a machine-trained (MT) network, the method comprising:

receiving an MT network comprising a plurality of layers of computation nodes, wherein each computation node computes an output value based on a set of input values and a set of trained weight values, wherein each layer has a set of allowed weight values;

for a first layer of the MT network with a first set of allowed weight values, defining a second layer with computation nodes corresponding to each of the computation nodes of the first layer, each second-layer computation node receiving the same input values as the corresponding first-layer computation node, wherein the second layer has a second, different set of allowed weight values, wherein the output values of the computation nodes of the first layer are added with the output values of the corresponding computation nodes of the second layer to compute output values that are passed to a subsequent layer of the MT network; and training the weight values of the MT network using alternating direction method of multipliers (i) to constrain the weight values of the first layer to the first set of allowed weight values, (ii) to constrain the weight values of the second layer to the second set of allowed weight values, and (iii) to impose a maximum on a number of nonzero weight values.

4. A method for training a plurality of parameters of a machine-trained (MT) network, the method comprising:

receiving an MT network comprising a plurality of layers of computation nodes, wherein each computation node computes an output value based on a set of input values and a set of trained weight values, wherein each layer has a set of allowed weight values;

for a first layer of the MT network with a first set of allowed weight values:

defining a second layer with computation nodes corresponding to each of the computation nodes of the first layer, each second-layer computation node receiving the same input values as the corresponding first-layer computation node, wherein the second layer has a second, different set of allowed weight values; and defining a third layer with computation nodes corresponding to each of the computation nodes of the first layer, each third-layer computation node receiving the same input values as the corresponding first-layer computation node, wherein the third layer has a third, different set of allowed weight values, wherein the output values of the computation nodes of the first layer are added with the output values of the corresponding computation nodes of the second layer and the third layer to compute output values that are passed to the subsequent layer of the MT network; and training the weight values of the MT network.

5. A non-transitory machine-readable medium storing a program which when executed by at least one processing unit trains a plurality of parameters of a machine-trained (MT) network, the program comprising sets of instructions for:

receiving an MT network comprising a plurality of layers of computation nodes, wherein each computation node computes an output value based on a set of input values and a set of trained weight values, wherein each layer has a set of allowed weight values;

for a first layer of the MT network with a first set of allowed weight values comprising a positive value, zero, and a negation of the positive value, defining a second layer with computation nodes corresponding to each of the computation nodes of the first layer, each second-layer computation node receiving the same input values as the corresponding first-layer computation node, wherein the second layer has a second set of allowed weight values comprising one-third the positive value, zero, and a negation of one-third the positive value, wherein the output values of the computation nodes of the first layer are added with the output values of the corresponding computation nodes of the second layer to compute output values that are passed to a subsequent layer of the MT network; and training the weight values of the MT network.

6. The method of claim 3, wherein the first set of allowed weight values comprises a positive value, zero, and a negation of the positive value.

7. The method of claim 6, wherein the second set of allowed weight values comprises one third the positive value, zero, and a negation of one third the positive value.

8. The method of claim 1, wherein training the weight values of the MT network comprises using a loss function with a term that biases the weight values of the first layer towards the values of the first set of allowed weight values.

9. The method of claim 4, wherein:

the first set of allowed weight values comprises a positive value, zero, and a negation of the positive value;

the second set of allowed weight values comprises one third the positive value, zero, and a negation of one third the positive value; and the third set of allowed weight values comprises one ninth the positive value, zero, and a negation of one ninth the positive value.

10. The method of claim 1, wherein training the network with the first and second layers replicates a single layer with a greater total number of allowed weight values.

11. The non-transitory machine-readable medium of claim 5, wherein the set of instructions for training the weight values of the MT network comprises a set of instructions for using a loss function with a term that biases the weight values of the first layer towards the values of the first set of allowed weight values.

12. The non-transitory machine-readable medium of claim 11, wherein the set of instructions for training the weight values of the MT network comprises a set of instructions for using a loss function with a term that ensures that a particular percentage of the weight values of the MT network have a value of zero.

13. The non-transitory machine-readable medium of claim 5, wherein the set of instructions for training the weight values of the MT network comprises a set of instructions for using alternating direction method of multipliers (i) to constrain the weight values of the first layer to the first set of allowed weight values, (ii) to constrain the weight values of the second layer to the second set of allowed weight values, and (iii) to impose a maximum on a number of nonzero weight values.

14. The non-transitory machine-readable medium of claim 5, wherein the program further comprises a set of instructions for defining a third layer with computation nodes corresponding to each of the computation nodes of the first layer, each third-layer computation node receiving the same input values as the corresponding first-layer computation node, wherein the third layer has a third, different set of allowed weight values, wherein the output values of the computation nodes of the first layer are added with the output values of the corresponding computation nodes of the second layer and the third layer to compute output values that are passed to the subsequent layer of the MT network.

15. The non-transitory machine-readable medium of claim 14, wherein the third set of allowed weight values comprises one ninth the positive value, zero, and a negation of one ninth the positive value.

16. The non-transitory machine-readable medium of claim 5, wherein training the network with the first and second layers replicates a single layer with a greater total number of allowed weight values.

17. The method of claim 1, wherein training the weight values of the MT network comprises using alternating direction method of multipliers.

18. The method of claim 2, wherein training the network with the first and second layers replicates a single layer with a greater total number of allowed weight values.

19. The method of claim 3, wherein the first set of allowed weight values comprises a positive value, zero, and a negation of the positive value.

20. The method of claim 4, wherein training the network with the first, second, and third layers replicates a single layer with a greater total number of allowed weight values.

* * * * *